United States Patent [19]

Mikoshiba et al.

[11] Patent Number: 5,344,933

[45] Date of Patent: Sep. 6, 1994

[54] PYRROLE RING- OR CONDENSED PYRROLE RING-CONTAINING AZOMETHINE DYE

[75] Inventors: Hisashi Mikoshiba; Katsuyoshi Yamakawa; Kozo Sato; Koushin Matsuoka, all of Kanagawa, Japan

[73] Assignee: Fuji Photo Film Co., Ltd., Kanagawa, Japan

[21] Appl. No.: 942,835

[22] Filed: Sep. 10, 1992

[30] Foreign Application Priority Data

Sep. 11, 1991 [JP] Japan .................... 3-258739
Oct. 16, 1991 [JP] Japan .................... 3-294784

[51] Int. Cl.$^5$ .................... C07D 471/04; C09B 55/00; B41M 5/00; B41M 5/30; G03C 7/30
[52] U.S. Cl. .................... 544/282; 548/559; 430/411; 430/581; 430/591
[58] Field of Search .................... 544/282; 548/559; 430/411, 581, 591

[56] References Cited

U.S. PATENT DOCUMENTS

| | | | |
|---|---|---|---|
| 3,121,093 | 2/1964 | Bortnick et al. | 548/559 X |
| 3,526,626 | 9/1970 | Houlihan | 544/282 |
| 3,769,274 | 10/1973 | Wollweber et al. | 548/559 X |
| 4,234,586 | 11/1980 | Hermecz et al. | 544/282 X |
| 4,367,229 | 1/1983 | Kukosi et al. | 544/282 X |
| 4,579,951 | 4/1986 | Pitzele et al. | 540/559 X |

FOREIGN PATENT DOCUMENTS

| | | | |
|---|---|---|---|
| 0702573 | 1/1965 | Canada | 546/121 |
| 1-179948 | 7/1989 | Japan | 546/121 |
| 4-15267 | 1/1992 | Japan | 548/559 |

*Primary Examiner*—Floyd D. Higel
*Attorney, Agent, or Firm*—Sughrue, Mion, Zinn, Macpeak & Seas

[57] ABSTRACT

An azomethine dye is disclosed, represented by the general formula (I), (II) or (III):

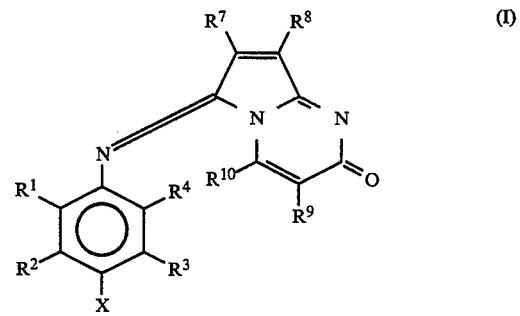

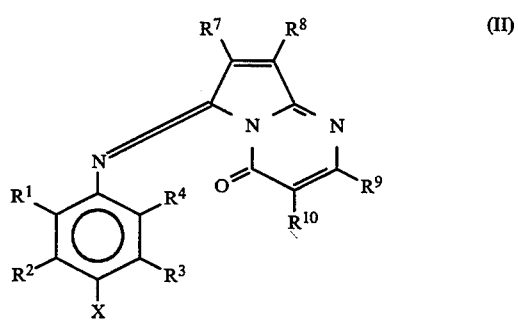

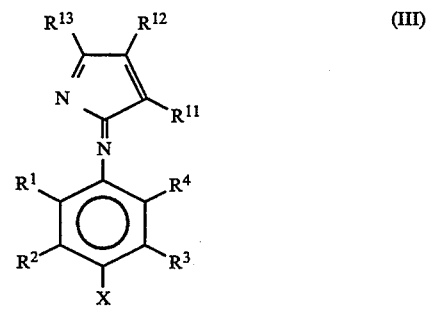

wherein $R^1$, $R^2$, $R^3$ and $R^4$ each independently represents a hydrogen atom or nonmetallic atom group; X represents —OH or —$NR^5R^6$; $R^5$ and $R^6$ each independently represents a hydrogen atom, alkyl group, aryl group or heterocyclic group; $R^7$, $R^8$, $R^9$, $R^{10}$, $R^{11}$, $R^{12}$ and $R^{13}$ each independently represents a hydrogen atom or nonmetallic atom group; and $R^1$ and $R^2$, and/or $R^2$ (Abstract continued on next page.)

and $R^5$, and/or $R^5$ and $R^6$, and/or $R^6$ and $R^3$, and/or $R^3$ and $R^4$, and/or $R^7$ and $R^8$, and/or $R^9$ and $R^{10}$, and/or $R^{11}$ and $R^{12}$, and/or $R^{12}$ and $R^{13}$ may be connected to each other to form a cyclic structure. A heat transfer dye providing material is also disclosed, comprising a support having thereon a dye providing layer containing a heat migrating dye, the dye providing layer comprising at least one azomethine dye represented by the general formula (I), (II) or (III).

11 Claims, 8 Drawing Sheets

PYRROLE RING-OR CONDENSED PYRROLE RING-CONTAINING AZOMETHINE DYE

FIELD OF THE INVENTION

The present invention relates to a novel azomethine dye. Also, the present invention relates to a heat transfer dye providing material containing such an azomethine dye.

BACKGROUND OF THE INVENTION

An azomethine dye, particularly an azomethine dye in which p-dialkylaminophenyl group is conneced to a nitrogen atom in imine is produced by the oxidative coupling reaction of an active methylene or phenol with an N,N-dialkyl-p-phenylenediamine. Such an azomethine dye has a wide range of tones such as yellow, red, magenta, blue and cyan and thus has been widely used as an image forming dye for silver halide color photographic materials for use in the subtractive color process with three colors, i.e., yellow, magenta and cyan. Blue and cyan dyes are produced from phenols, naphthols and 2,4-diphenylimidazoles. Magenta and blue dyes are produced from 5-pyrazolones, acylacetonitriles, 1H-pyrazolo[1,5-a]benzimidazoles, 1H-pyrazolo[5,1-c]-1,2,4-triazoles, and 1H-pyrazolo[2,3-b]-1,2,4-triazoles. Yellow dyes are produced from acylacetanilides, diacylmethanes and malondianilides. These dyes are further described in JP-A-60-186567, JP-A-63-145281 and JP-A-63-113077 (the term "JP-A" as used herein means an "unexamined published Japanese patent application").

In recent years, new color image forming methods such as color electrophotography, ink jet process and heat-sensitive transfer process have been proposed. On the other hand, the increasing demand for filters for solid image pickup tube and color liquid crystal television coupled with the development of electronic imaging has caused azomethine dyes to be applied and studied not only in color photography but also in various systems or merchandises. Further, dyes which exhibit absorption in the infrared region are disclosed in JP-A-3-81192, JP-A-3-81193, JP-A-3-81194, and JP-A-2-172794.

However, these azomethine dyes have many disadvantages. For example, they exhibit a low fastness to heat, moisture, light, chemicals, air, etc., can hardly be synthesized and are expensive.

In particular, many of azomethine dyes which exhibit absorption in the near infrared region have a low fastness. Thus, the development of azomethine dyes having a high fastness have been keenly desired.

Moreover, these known azomethine dyes show a broad absorption wavelength or exhibit unnecessary absorption. Thus, they leave much to be desired as image forming dyes or filter dyes, Besides the above mentioned disadvantages, these known azomethine dyes have further disadvantages that when used as heat transfer dyes, they can hardly heat-migrate, they exhibit a low fastness to heat, light, moisture, air, oxygen, chemicals, etc., they are susceptible to a drop in the image sharpness, they can easily be retransferred, they can hardly form a heat transfer dye providing material (that is, they have a low solubility), they are susceptible to image bleeding with time, and they can deteriorate the light fastness of other dyes.

SUMMARY OF THE INVENTION

In order to solve these problems, the inventors developed quite a novel azomethine dye. Further, when the inventors used the azomethine dye as a heat transfer dye, it was found that an excellent heat transfer dye providing material can be obtained from this azomethine dye. Thus, the present invention was worked out.

It is an object of the present invention to provide a dye having a high fastness to heat, light, moisture, air and chemicals.

It is another object of the present invention to provide a dye which can be easily synthesized and inexpensively supplied in quantity.

It is a further object of the present invention to provide a dye having excellent properties for image forming or filter dyes.

It is other object of the present invention to provide a novel dye having absorption in the near infrared region.

It is still other object of the present invention to provide a novel heat transfer azomethine dye which exhibits excellent transferability (heat-migratability), high image fastness, little sharpness drop and little retransfer and can easily form a heat transfer dye providing material when used as a heat transfer dye.

It is yet another object of the present invention to provide a heat transfer dye providing material comprising a novel azomethine dye which can eliminate the disadvantages of heat transfer dye providing materials comprising the conventionally known dyes.

These and other objects of the present invention will become more apparent from the following detailed description and examples.

These objects of the present invention are accomplished with an azomethine dye represented by the general formula (I), (II) or (III):

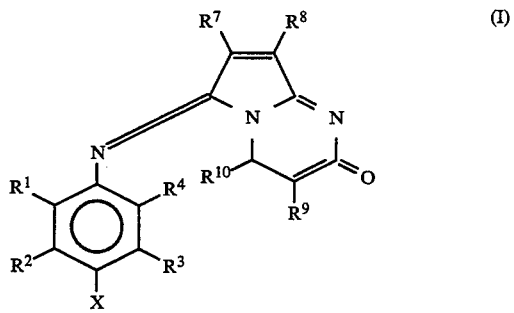

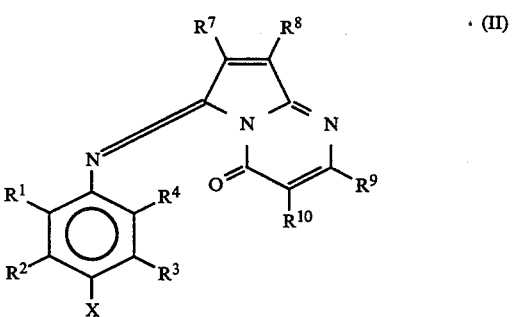

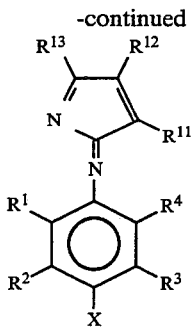

(III)

wherein $R^1$, $R^2$, $R^3$ and $R^4$ each independently represents a hydrogen atom or nonmetallic atom group; X represents —OH or —$NR^5R^6$; $R^5$ and $R^6$ each independently represents a hydrogen atom, alkyl group, aryl group or heterocyclic group; $R^7$, $R^8$, $R^9$, $R^{10}$, $R^{11}$, $R^{12}$ and $R^{13}$ each independently represents a hydrogen atom or nonmetallic atom group; and $R^1$ and $R^2$, and/or $R^2$ and $R^5$, and/or $R^5$ and $R^6$, and/or $R^6$ and $R^3$, and/or $R^3$ and $R^4$, and/or $R^7$ and $R^8$, and/or $R^9$ and $R^{10}$, and/or $R^{11}$ and $R^{12}$, and/or $R^{12}$ and $R^{13}$ may be connected to each other to form a cyclic structure.

BRIEF DESCRIPTION OF THE DRAWINGS

By way of example and to make the description more clear, reference is made to the accompanying drawings in which.

DETAILED DESCRIPTION OF THE INVENTION

Figure 1:
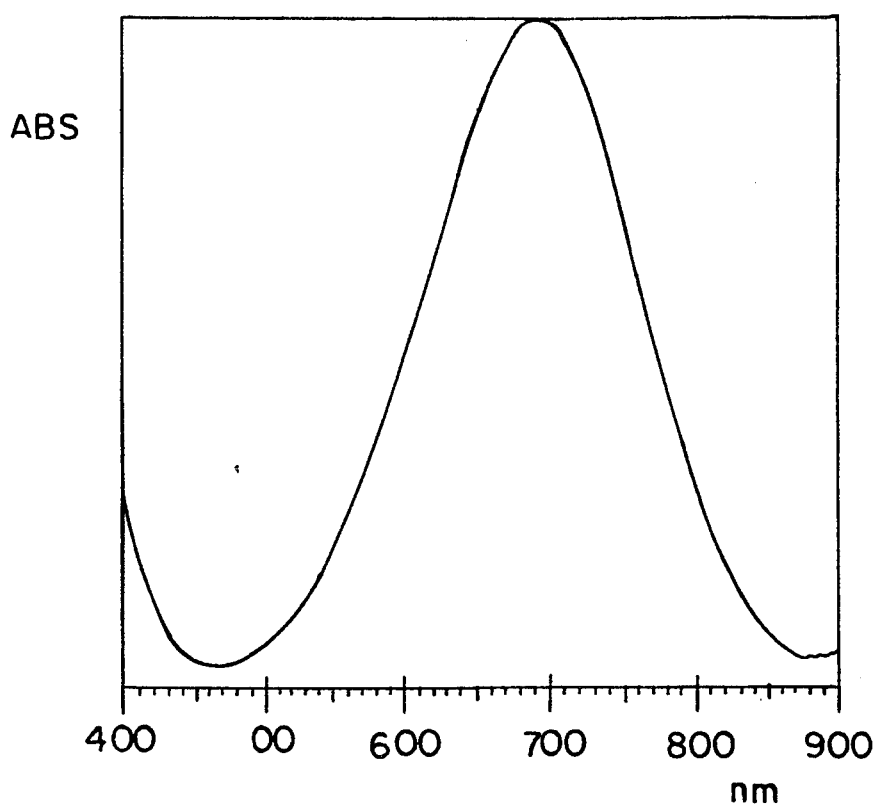
FIG. 1 illustrates the absorption characteristics of Dye 1 of the present invention in ethyl acetate.
Figure 2:
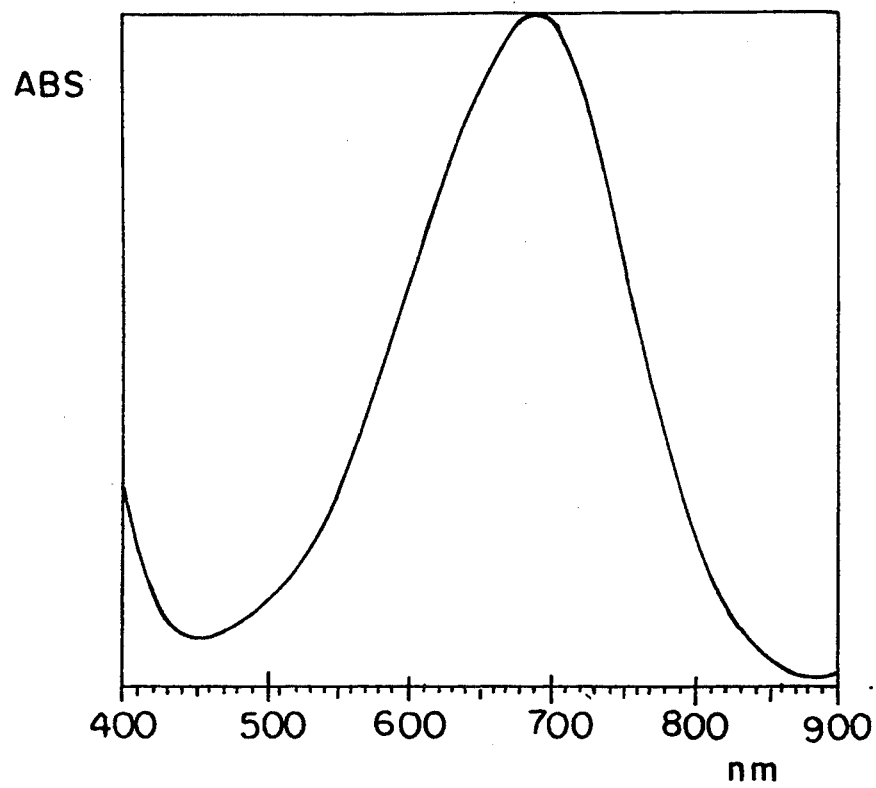
FIG. 2 illustrates the absorption characteristics of Dye 2 of the present invention in ethyl acetate.
Figure 3:
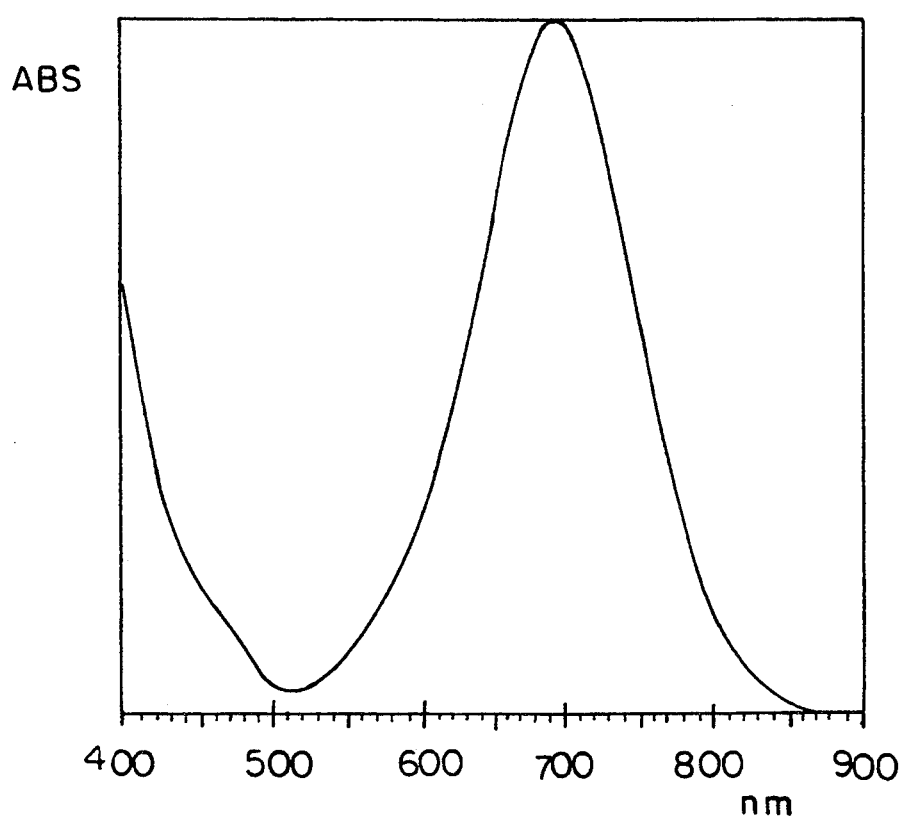
FIG. 3 illustrates the absorption characteristics of Dye 8 of the present invention in ethyl acetate.
Figure 4:
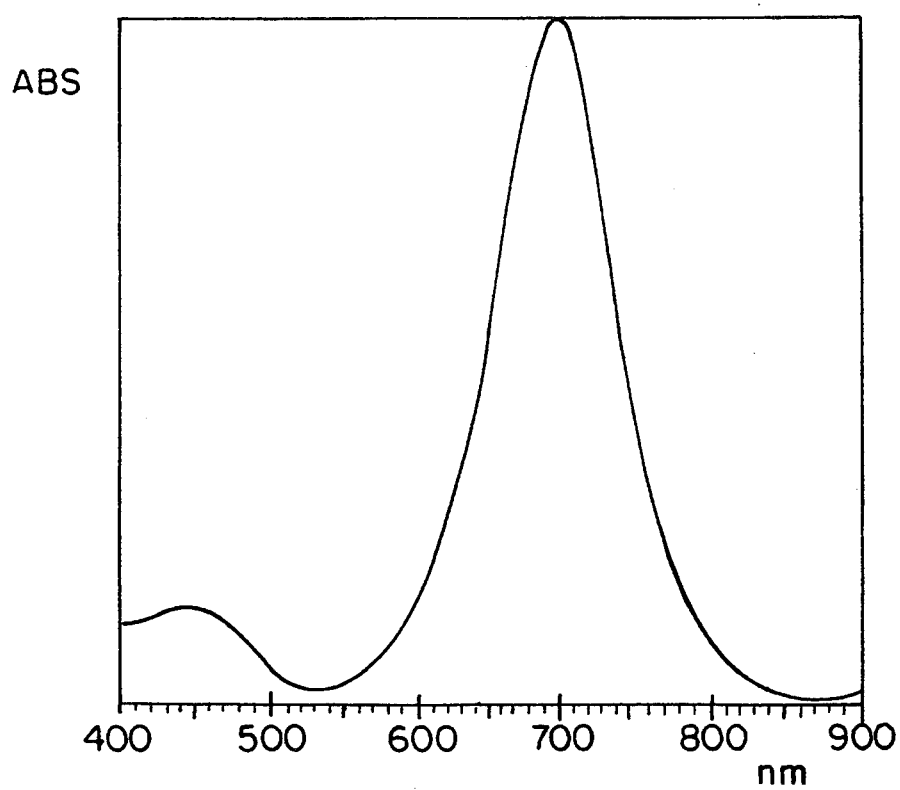
FIG. 4 illustrates the absorption characteristics of Dye 12 of the present invention in ethyl acetate.
Figure 5:
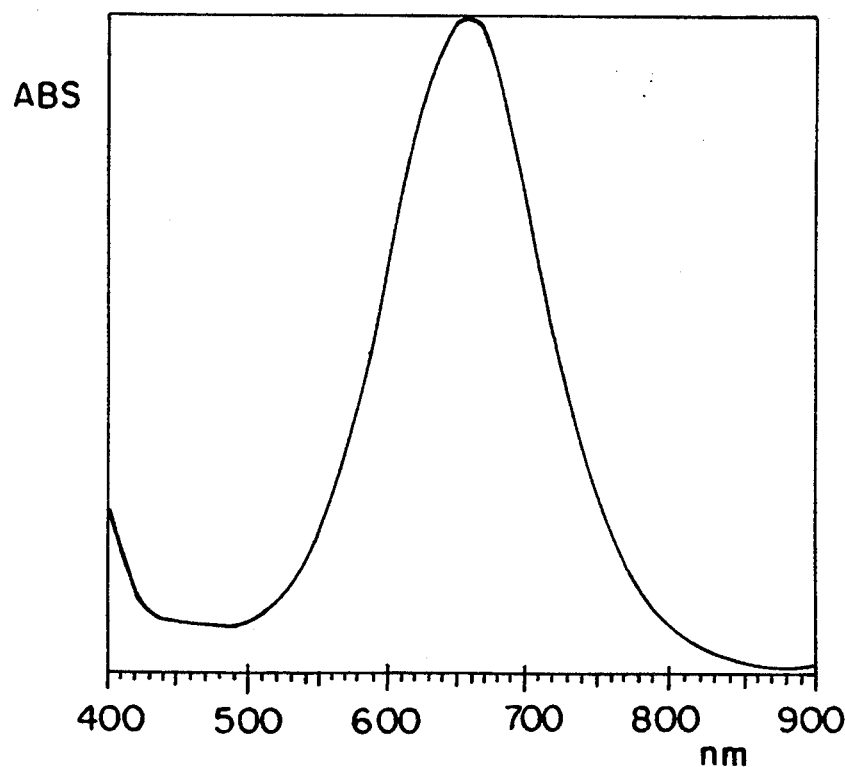
FIG. 5 illustrates the absorption characteristics of Dye 23 of the present invention in ethyl acetate.
Figure 6:
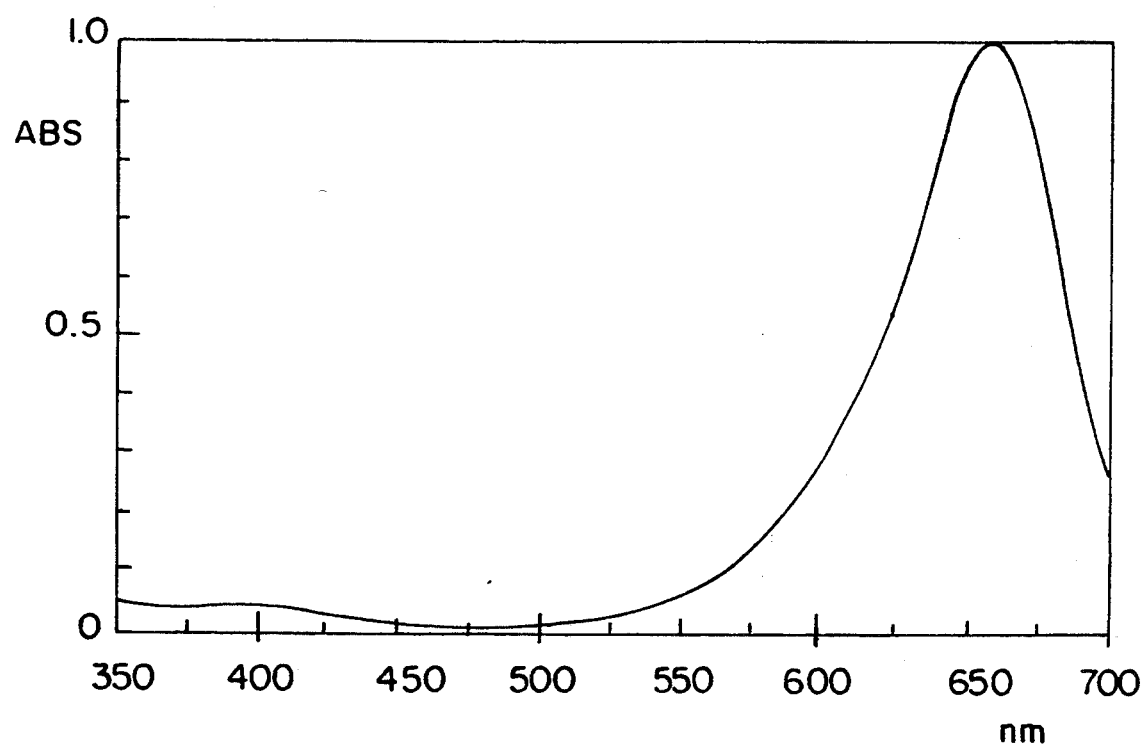
FIG. 6 illustrates the absorption characteristics of Dye 101 of the present invention in ethyl acetate.
Figure 7:
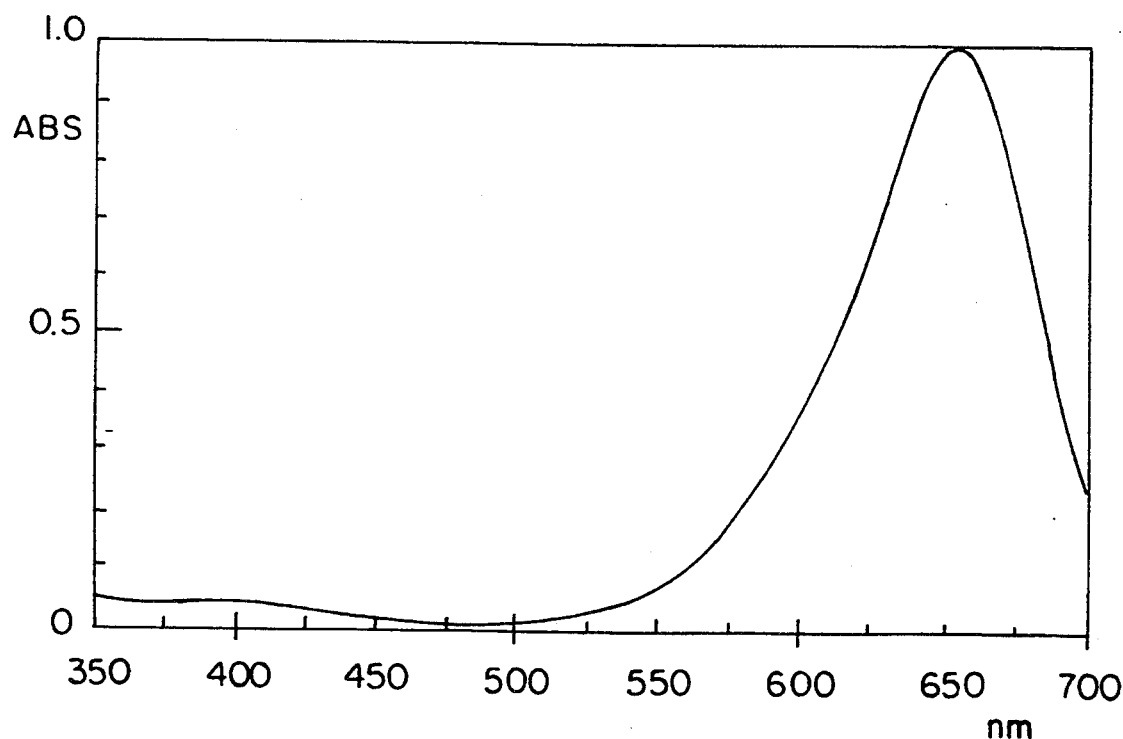
FIG. 7 illustrates the absorption characteristics of Dye 102 of the present invention in ethyl acetate.
Figure 8:
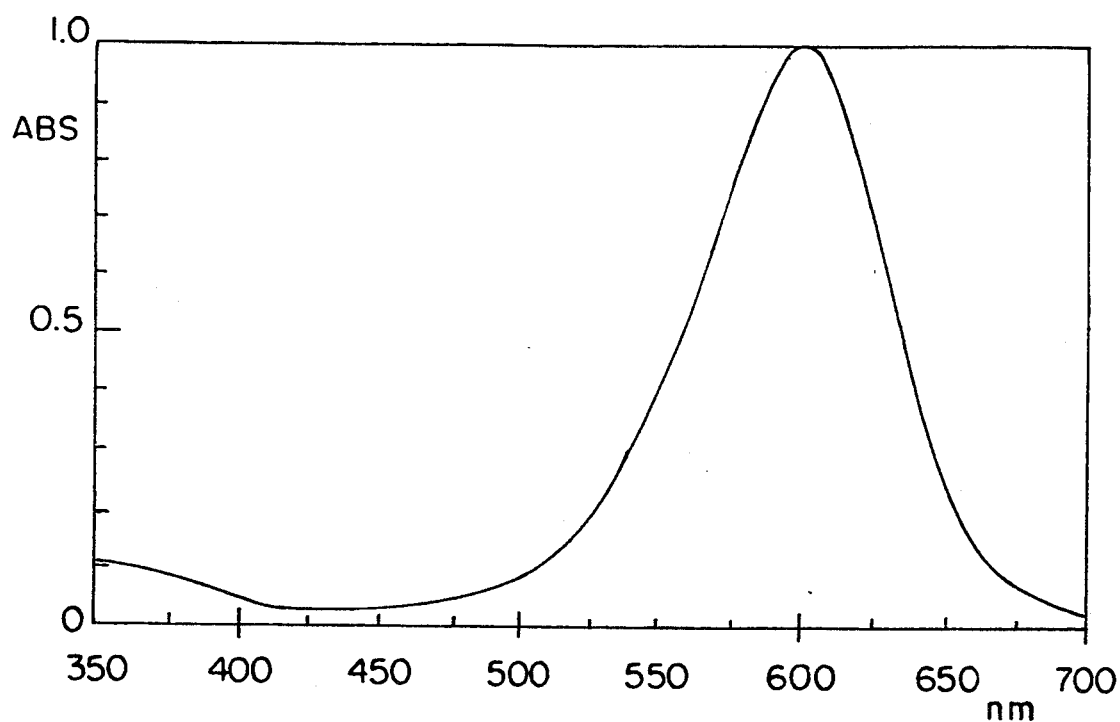
FIG. 8 illustrates the absorption characteristics of Dye 104 of the present invention in ethyl acetate.
Figure 9:
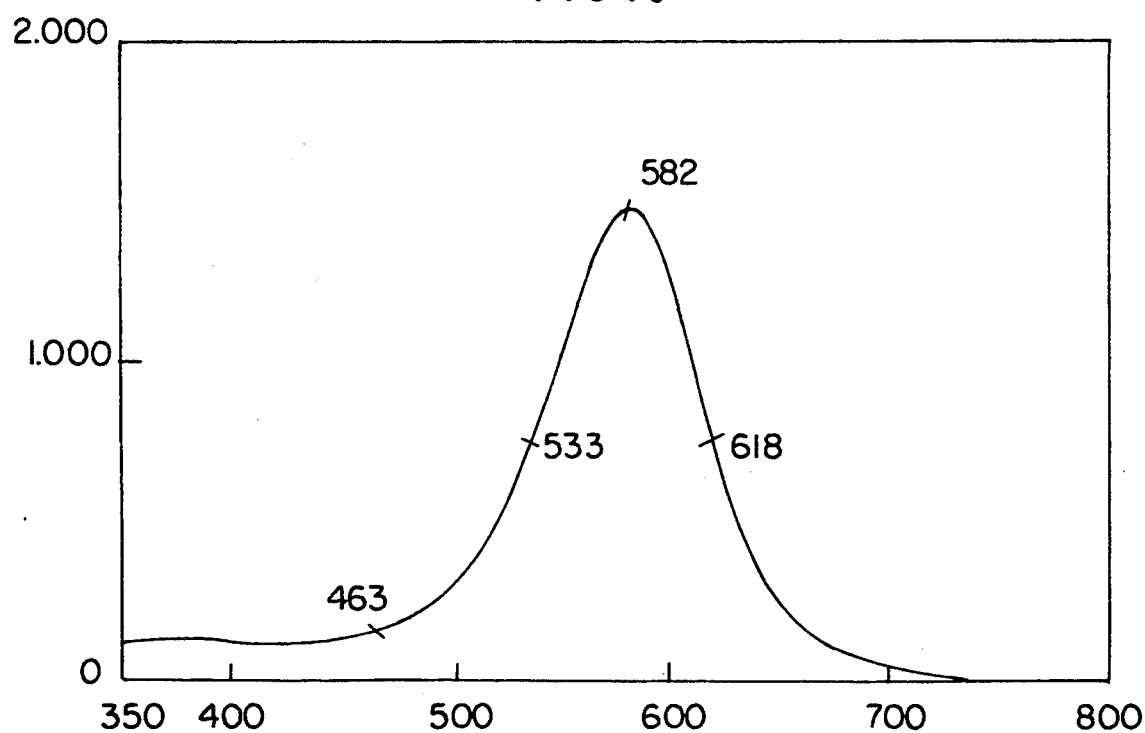
FIG. 9 illustrates the absorption characteristics of Dye 105 of the present invention in ethyl acetate.
Figure 10:
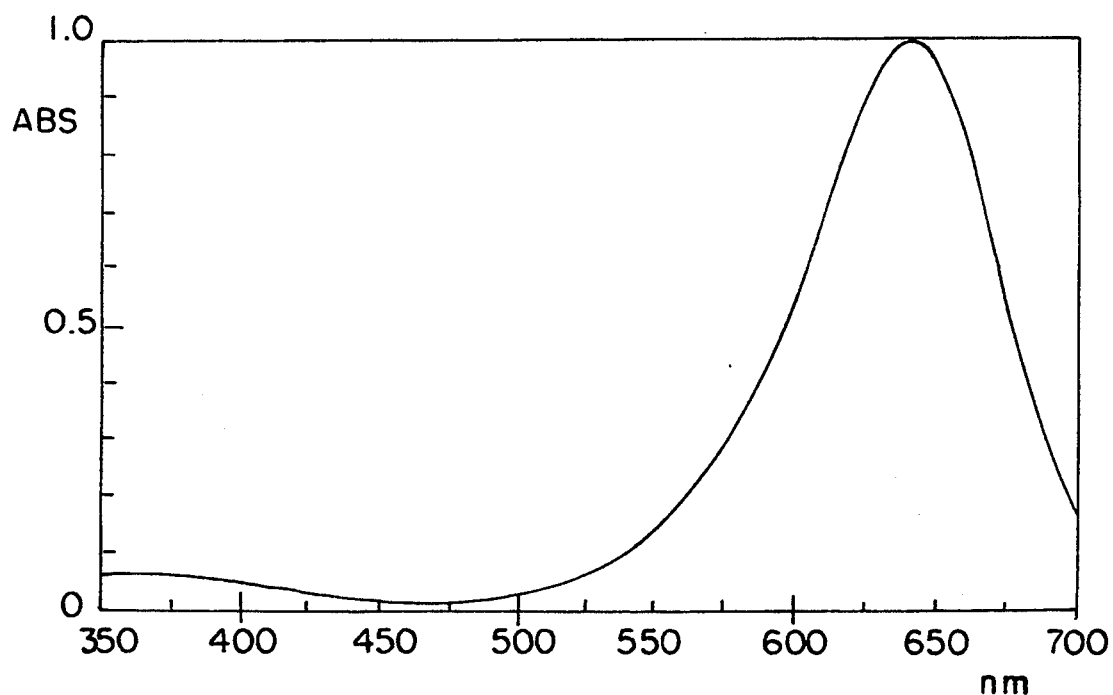
FIG. 10 illustrates the absorption characteristics of Dye 106 of the present invention in ethyl acetate.
Figure 11:
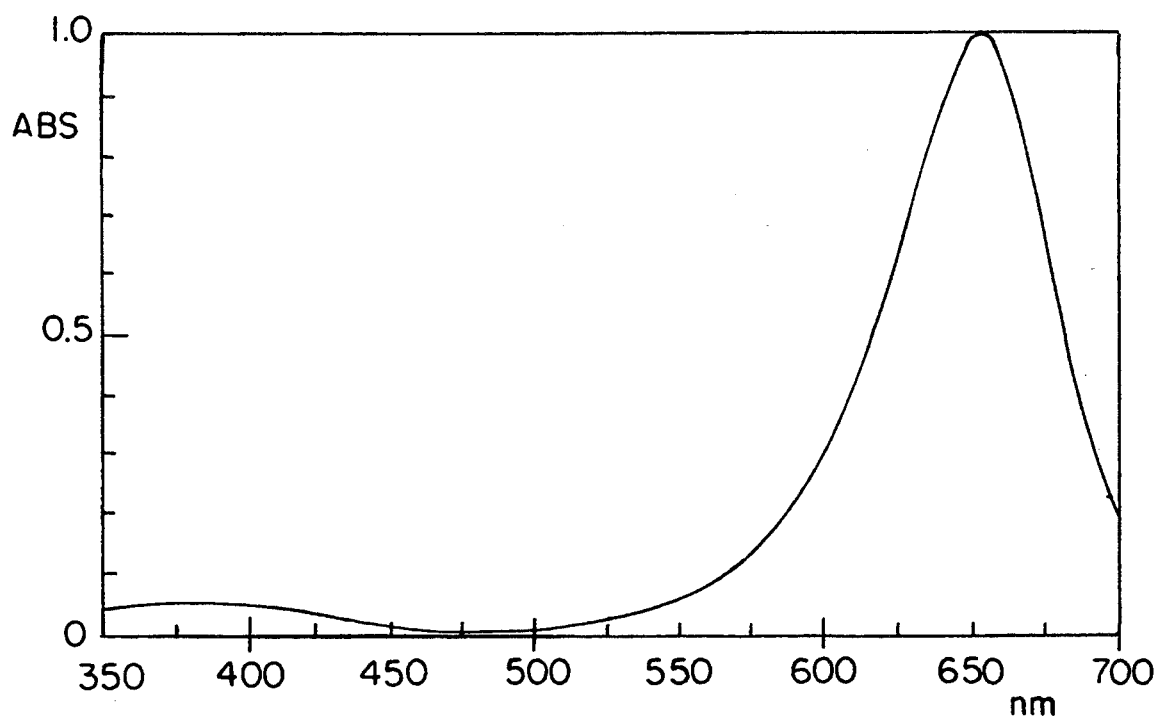
FIG. 11 illustrates the absorption characteristics of Dye 128 of the present invention in ethyl acetate.
Figure 12:
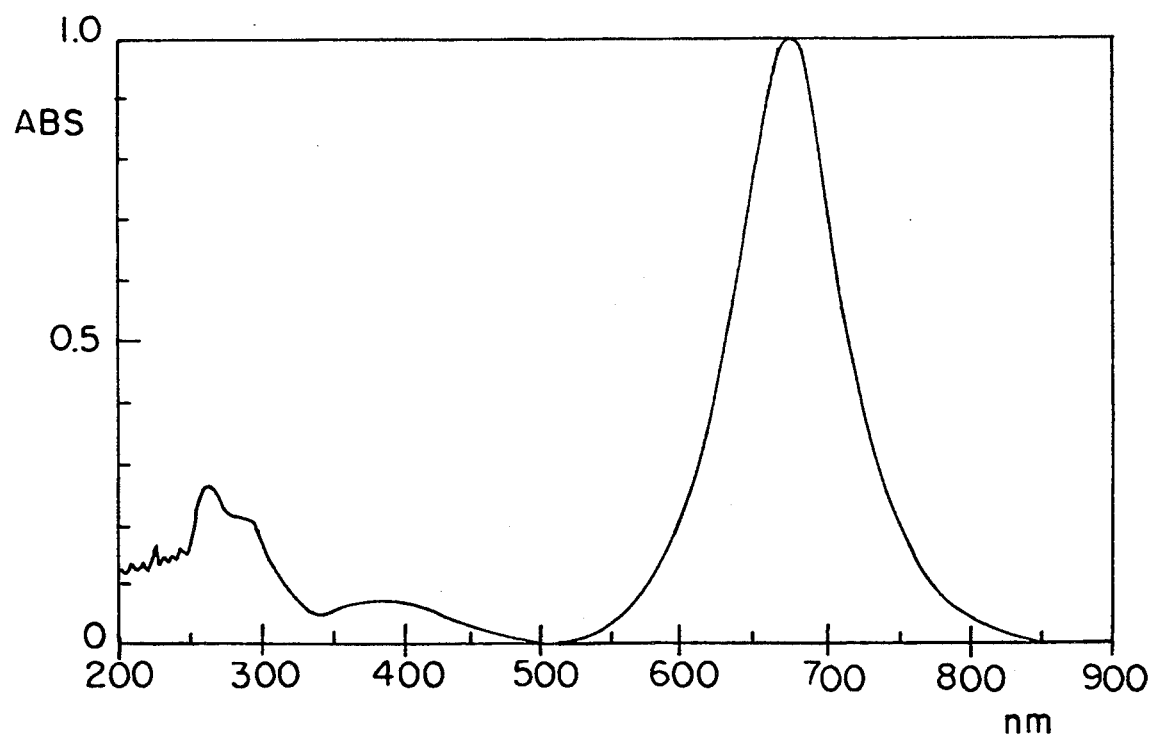
FIG. 12 illustrates the absorption characteristics of Dye 129 of the present invention in ethyl acetate.
Figure 13:
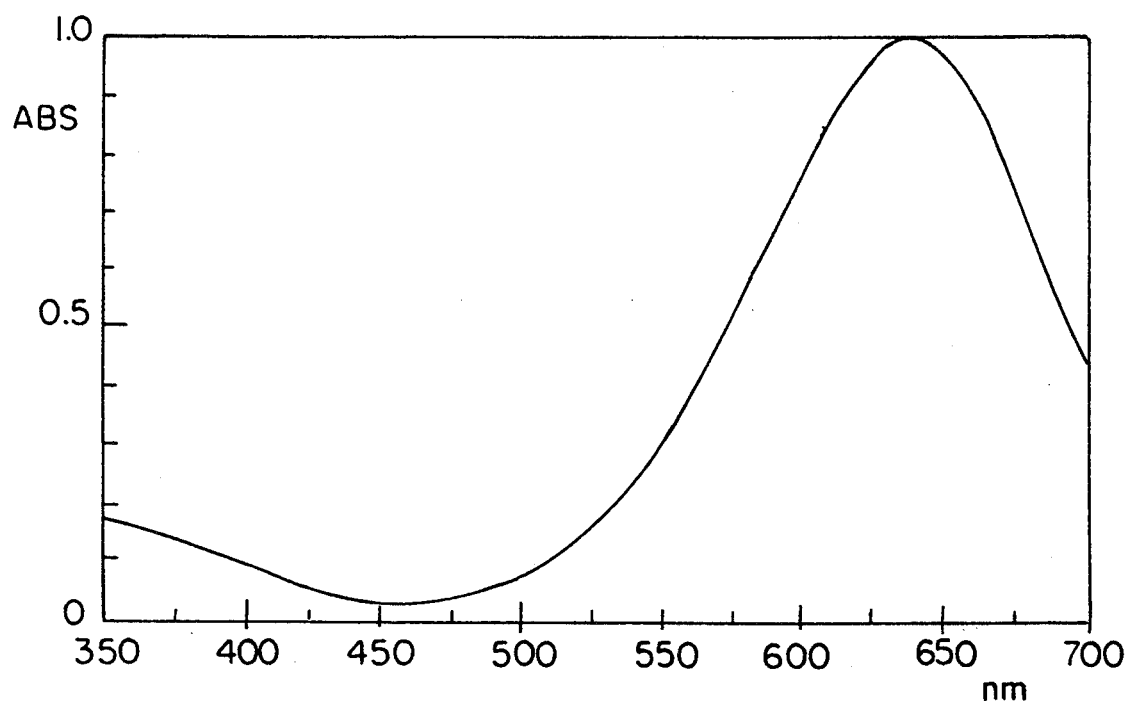
FIG. 13 illustrates the absorption characteristics of Dye 130 of the present invention in ethyl acetate.
Figure 14:
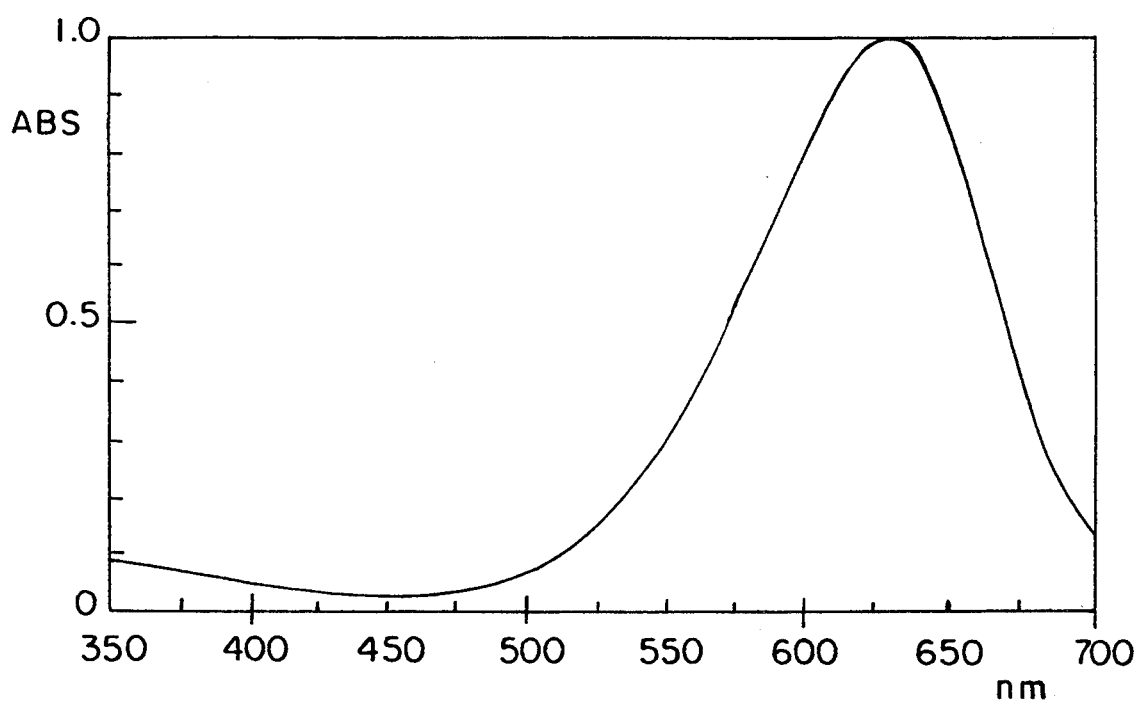
FIG. 14 illustrates the absorption characteristics of Dye 131 of the present invention in ethyl acetate.

The general formulae (I), (II) and (III) will be further described hereinafter.

$R^1$, $R^2$, $R^3$ and $R^4$ each independently represents a hydrogen atom or nonmetallic atom group. Examples of such a nonmetallic atom group include halogen atom, alkyl group, aryl group, heterocyclic group, cyano group, hydroxyl group, nitro group, amino group (including substituted amino group, quaternary amino group, anilino group), alkoxy group, aryloxy group, acylamino group, aminocarbonylamino group, sulfamoylamino group, alkylthio group, arylthio group, alkoxycarbonylamino group, sulfonylamino group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, imido group, heterocyclic thio group, sulfinyl group, phosphoryl group, acyl group, carboxylic group (including salts thereof), and sulfonic group (including salts thereof).

Specific preferred examples of the groups represented by $R^1$, $R^2$, $R^3$ and $R^4$ include hydrogen atom, alkyl group (preferably $C_{1-30}$ alkyl group, e.g., methyl, ethyl, propyl, butyl), alkoxy group (preferably $C_{1-30}$ alkoxy group, e.g., methoxy, ethoxy, methoxyethoxy, isopropoxy), halogen atom (e.g., bromine, fluorine, chlorine), acylamino group [preferably $C_{1-30}$ alkylcarbonylamino group (e.g., formylamino, acetylamino, propionylamino, cyanoacetylamino), $C_{7-30}$ arylcarbonylamino group (e.g., benzoylamino, p-toluylamino, pentafluorobenzoylamino, m-methoxybenzoylamino)], alkoxycarbonyl group (preferably $C_{2-30}$ alkoxycarbonyl group, e.g., methoxycarbonyl, ethoxycarbonyl), cyano group, sulfonylamino group (preferably $C_{1-30}$ sulfonylamino group, e.g., methanesulfonylamino, ethanesulfonylamino, N-methylmethanesulfonylamino), carbamoyl group [preferably $C_{2-30}$ alkylcarbamoyl group (e.g., methylcarbamoyl, dimethylcarbamoyl, butylcarbamoyl, isopropylcarbamoyl, t-butylcarbamoyl, cyclopentylcarbamoyl, cyclohexylcarbamoyl, methoxyethylcarbamoyl, chloroethylcarbamoyl, cyanoethylcarbamoyl, ethylcyanoethylcarbamoyl, benzylcarbamoyl, ethoxycarbonylmethylcarbamoyl, furfurylcarbamoyl, tetrahydrofurfurylcarbamoyl, phenoxymethylcarbamoyl, allylcarbamoyl, crotylcarbamoyl, prenylcarbamoyl, 2,3-dimethyl-2-butenylcarbamoyl, homoallylcarbamoyl, homocrotylcarbamoyl, homoprenylcarbamoyl), $C_{7-30}$ arylcarbamoyl group (e.g., phenylcarbamoyl, p-toluylcarbamoyl, m-methoxyphenylcarbamoyl, 4,5-dichlorophenylcarbamoyl, p-cyanophenylcarbamoyl, p-acetylaminophenylcarbamoyl, p-methoxycarbonylphenylcarbamoyl, m-trifluoromethylphenylcarbamoyl, o-fluorophenylcarbamoyl, 1-naphthylcarbamoyl), $C_{4-30}$ heterylcarbamoyl group (e.g., 2-pyridylcarbamoyl, 3-pyridylcarbamoyl, 4-pyridylcarbamoyl, 2-thiazolylcarbamoyl, 2-benzthiazolylcarbamoyl, 2-benzimidazolylcarbamoyl, 2-(4-methylphenyl)-1,3,4-thiadiazolylcarbamoyl)], sulfamoyl group (preferably $C_{0-30}$ sulfamoyl group, e.g., methylsulfamoyl, dimethylsulfamoyl), aminocarbonylamino group (preferably $C_{1-30}$ aminocarbonylamino group, e.g., methylaminocarbonylamino, dimethylaminocarbonylamino), alkoxycarbonylamino group (preferably $C_{2-30}$ alkoxycarbonylamino group, e.g., methoxycarbonylamino, ethoxycarbonylamino), hydroxyl group, amino group (preferably $C_{0-30}$ amino group, e.g., amino, methylamino, dimethylamino, anilino), aryl group (preferably $C_{6-30}$ aryl group, e.g., phenyl, m-acetylphenyl, p-methoxyphenyl), heterocyclic group (preferably $C_{3-30}$ heterocyclic group, e.g., 2-pyridyl, 2-furyl, 2-tetrahydrofuryl), nitro group, aryloxy group (preferably $C_{6-30}$ aryloxy group, e.g., phenoxy, p-methoxyphenoxy, o-chlorophenoxy), sulfamoylamino group (preferably $C_{0-30}$ sulfamoyl group, e.g., methylsulfamoylamino, dimethylsulfamoylamino), alkylthio group (preferably $C_{1-30}$ alkylthio group, e.g., methylthio, ethylthio), arylthio group (preferably $C_{6-30}$ arylthio group, e.g., phenylthio, p-methoxyphenylthio, o-chlorophenylthio), sulfonyl group (preferably $C_{1-30}$ sulfonyl group, e.g., methanesulfonyl, p-toluenesulfonyl), acyl group (preferably $C_{1-30}$ acyl group, e.g., formyl, acetyl, benzoyl, p-toluyl), heterocyclic oxy group (preferably $C_{3-30}$ heterocyclic oxy group), azo group (preferably $C_{3-30}$ azo group, e.g., p-nitrophenylazo), acyloxy group (preferably $C_{1-30}$ acyloxy group, e.g., acetyloxy, benzoyloxy), carbamoyloxy group (preferably $C_{1-30}$ carbamoyloxy group, e.g., methylcarbamoyloxy), silyloxy group (preferably $C_{3-30}$ silyloxy group, e.g., trimethylsiloxy), aryloxycarbonyl group (preferably $C_{7-30}$ aryloxycarbonyl group, e.g., phenoxycarbonyl), imido group (preferably $C_{4-30}$ imido group, e.g., phthalimido group), heterocyclic thio group (preferably $C_{3-30}$ heterocyclic thio group), sulfinyl group (preferably $C_{1-30}$ sulfinyl group, e.g., diethylaminosulfinyl), phosphoryl group (preferably $C_{0-30}$ phosphoryl group, e.g., diaminophosphoryl), carboxylic group (including sodium and potassium salts thereof), and sulfonic group (including sodium and potassium salts thereof).

Preferred among the groups represented by $R^2$, $R^3$ and $R^4$ is hydrogen atom.

Preferred among the groups represented by $R^1$ are hydrogen atom, $C_{1-30}$ alkyl group, $C_{1-30}$ alkoxy group, halogen atom (e.g., fluorine, chlorine, bromine), $C_{1-30}$ acylamino group, $C_{1-30}$ sulfonylamino group, $C_{1-30}$ aminocarbonylamino group, and $C_{2-30}$ alkoxycarbonylamino group. Most preferred among the groups represented by $R^1$ are hydrogen atom, alkyl group, and acylamino group.

X represents —OH or —$NR^5R^6$.

$R^5$ and $R^6$ each independently represents a hydrogen atom, alkyl group (preferably $C_{1-30}$ alkyl group, e.g., methyl, ethyl, propyl, isopropyl, butyl, 2-methoxyethyl, 3-methoxypropyl, ethoxyethyl, 2-phenylethyl, 2-cyanoethyl, cyanomethyl, 2-chloroethyl, 3-bromopropyl, 2-methoxycarbonylethyl, 2-ethoxycarbonylpropyl, 2-(N-methylaminocarbonyl)ethyl, 3-(N,N-dimethylaminocarbonyl)propyl, 2-acetylaminoethyl, 3-(ethylcarbonylamino)propyl, 2-acetyloxyethyl, allyl, homoallyl, prenyl, n-dodecyl, 2-methanesulfonylaminoethyl), aryl group (preferably $C_{6-30}$ aryl group, e.g., phenyl, p-tolyl, p-methoxyphenyl, 2,4-dichlorophenyl, p-nitrophenyl, 2,4-dicyanophenyl, 2-naphthyl) or heterocyclic group (including substituted heterocyclic groups, preferably $C_{3-30}$ heterocyclic group, e.g., groups represented by the following formulae).

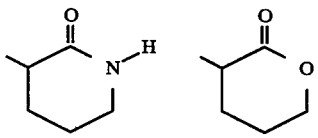

X is preferably —$NR^5R^6$.

Preferred among the groups represented by $R^5$ and $R^6$ are $C_{1-20}$ alkyl groups which may be substituted (e.g., methyl, ethyl, propyl, 2-cyanoethyl, 2-acetyloxyethyl, 2-ethoxycarbonylethyl, 2-methoxyethyl, allyl, homoallyl, prenyl).

Examples of the ring formed by the connection of $R^5$ to $R^6$ include groups represented by the following formulae:

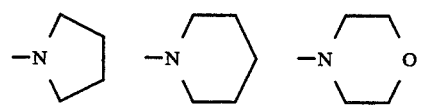

Preferred examples of the ring formed by the connection of $R^2$ to $R^5$ and/or $R^3$ to $R^6$ include groups represented by the following formulae:

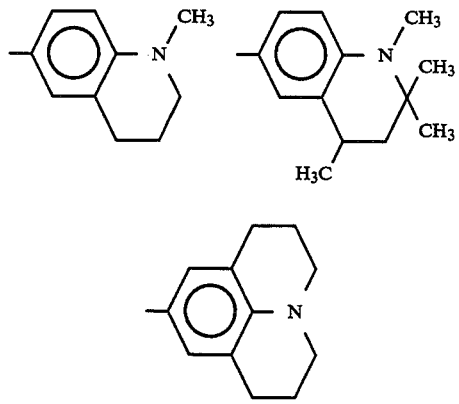

$R^7$, $R^8$, $R^9$, $R^{10}$, $R^{11}$, $R^{12}$ and $R^{13}$ each represents a hydrogen atom or nonmetallic substituent. Specific examples of the groups represented by $R^7$, $R^8$, $R^9$, $R^{10}$, $R^{11}$, $R^{12}$ and $R^{13}$ include hydrogen atom, aryl group, alkyl group, cyano group, acyl group, carbamoyl group, alkoxycarbonyl group, aryloxycarbonyl group, acylamino group, alkoxycarbonylamino group, aryloxycarbonylamino group, sulfonylamino group, aminocarbonylamino group, sulfamoylamino group, amino group (including anilino group), alkoxy group, aryloxy group, silyloxy group, heteryloxy group, alkylthio group, arylthio group, hererylthio group, heterocyclic group, halogen atom, hydroxyl group, nitro group, sulfamoyl group, sulfonyl group, azo group, acyloxy group, carbamoyloxy group, imido group, sulfinyl group, phosphoryl group, carboxylic group (including salts thereof), and sulfonic group (including salts thereof).

Specific preferred examples of the groups represented by $R^7$, $R^8$, $R^9$, $R^{10}$, $R^{11}$, $R^{12}$ and $R^{13}$ include hydrogen atom, aryl group (preferably $C_{6-30}$ aryl group, e.g., phenyl, m-acetylaminophenyl, p-methoxyphenyl), alkyl group (preferably $C_{1-30}$ alkyl group, e.g., methyl, ethyl, isopropyl, t-butyl, n-octyl, n-dodecyl), cyano group, acyl group (preferably $C_{1-30}$ acyl group, e.g., acetyl, pivaloyl, benzoyl, fluoyl, 2-pyridylcarbonyl), carbamoyl group (preferably $C_{1-30}$ carbamoyl group, e.g., methylcarbamoyl, ethylcarbamoyl, dimethylcarbamoyl, n-octylcarbamoyl), alkoxycarbonyl group (preferably $C_{1-30}$ alkoxycarbonyl group, e.g., methoxycarbonyl, ethoxycarbonyl, isopropoxycarbonyl), aryloxycarbonyl group (preferably $C_{7-30}$ aryloxycarbonyl group, e.g., phenoxycarbonyl, p-methoxyphenoxycarbonyl, m-chlorophenoxycarbonyl, o-methoxyphenoxycarbonyl), acylamino group [preferably $C_{1-30}$ alkylcarbonylamino group (e.g., formylamino, acetylamino, propionylamino, cyanoacetylamino), $C_{7-30}$ arylcarbonylamino group (e.g., benzoylamino, p-toluylamino, pentafluorobenzoylamino, m-methoxybenzoylamino), $C_{4-30}$ heterylcarbonylamino group (e.g., 2-pyridylcarbonylamino, 3-pyridylcarbonylamino, fluoylamino)], alkoxycarbonylamino group (preferably $C_{2-30}$ alkoxycarbonylamino group, e.g., methoxycarbonylamino, ethoxycarbonylamino, methoxyethoxycarbonylamino), aryloxycarbonylamino group (preferably $C_{7-30}$ aryloxycarbonylamino group, e.g., phenoxycarbonylamino, p-methoxyphenoxycarbonylamino, p-methylphenoxycarbonylamino, m-chlorophenoxycarbonylamino, o-chlorophenoxycarbonylamino), sulfonylamino group (preferably $C_{1-30}$ sulfonylamino group, e.g., methanesulfonylamino, benzenesulfonylamino, toluenesulfonylamino), aminocarbonylamino group (preferably $C_{1-30}$ aminocarbonylamino group, e.g., methylaminocarbonylamino, ethylaminocarbonylamino, anilinocarbonylamino, dimethylaminocarbonylamino), sulfamoylamino group (preferably $C_{1-30}$ sulfamoylamino group, e.g., methylaminosulfonylamino, ethylaminosulfonylamino, anilinosulfonylamino), amino group (including anilino group, preferably $C_{0-30}$ amino group, e.g., amino, methylamino, ethylamino, diethylamino, n-butylamino, anilino), alkoxy group (preferably $C_{1-30}$ alkoxy group, e.g., methoxy, ethoxy, isopropoxy, n-butoxy, methoxyethoxy, n-dodecyloxy), aryloxy group (preferably $C_{6-30}$ aryloxy group, e.g., phenoxy, m-chlorophenoxy, p-methoxyphenoxy, o-methoxyphenoxy), silyloxy group (preferably $C_{3-30}$ silyloxy group (preferably $C_{3-30}$ silyoxy group, e.g., trimethylsilyloxy, t-butyldimethylsilyloxy, cetyldimethylsilyloxy, phenyldimethylsilyloxy), heteryloxy group (preferably $C_{3-30}$ heteryloxy group, e.g., tetrahydropyranyloxy, 3-pyridyloxy, 2-(1,3-benzoimidazolyl)oxy), alkylthio group (preferably $C_{1-30}$ alkylthio group, e.g., methylthio, ethylthio, n-butylthio, t-butylthio), arylthio group (preferably $C_{6-30}$ arylthio group, e.g., phenylthio), herylthio group (preferably $C_{3-30}$ herylthio group, e.g., 2-pyridylthio, 2-(1,3-benzoxazolyl)thio, 1-hexadecyl-1,2,3,4-tetrazolyl-5-thio, 1-(3-N-octadecylcarbamoyl)phenyl-1,2,3,4-tetrazolyl-5-thio), heterocyclic group (preferably $C_{3-30}$ heterocyclic group, e.g., 2-benzoxazolyl, 2-benzothiazolyl, 1-phenyl-2-benzimidazolyl, 5-chloro-1-tetrazolyl, 1-pyrrolyl, 2-furanyl, 2-pyridyl, 3-pyridyl), halogen atom (e.g., fluorine, chlorine, bromine), hydroxyl group, nitro group, sulfamoyl group (preferably $C_{0-30}$ sulfamoyl group, e.g., methylsulfamoyl, dimethylsulfamoyl), sulfonyl group (preferably $C_{1-30}$ sulfonyl group, e.g., methanesulfonyl, benzenesulfonyl, toluenesulfonyl), azo group (preferably $C_{3-30}$ azo group, e.g., p-nitrophenylazo), acyloxy group (preferably $C_{1-30}$ acyloxy group, e.g., formyloxy, acetyloxy, benzoyloxy), carbamoyloxy group (preferably $C_{1-30}$ carbamoyloxy group, e.g., methylcarbamoyloxy, diethylcarbamoyloxy), imido group (preferably $C_{4-30}$ imido group, e.g., succinimido, phthalimido), sulfinyl group (preferably $C_{1-30}$ sulfinyl group, e.g., diethylaminosulfinyl), phosphoryl group (preferably $C_{0-30}$ phosphoryl group, e.g., diaminophosphoryl), carboxylic group (including sodium and potassium salts thereof), and sulfonic group (including sodium and potassium salts thereof).

The pyrrolopyrimidin-5-one azomethine dye and pyrrolopyrimidin-7-one azomethine dye of the present invention represented by the general formula (I) or (II) can have various hues depending on the selection of $R^1$, $R^2$, $R^3$, $R^4$, $R^5$, $R^6$, $R^7$, $R^8$, $R^9$, and $R^{10}$.

In order to render the hue of the pyrrolopyrimidin-5-one azomethine dye and pyrrolopyrimidin-7-one azomethine dye of the present invention represented by the general formula (I) or (II) bluish or cyan, at least one of $R^7$ and $R^8$ needs to be an electrophilic group whose Hammett's substituent constant $\sigma p$ is 0.15 or more.

In order to render the hue of the pyrrolopyrimidin-5-one azomethine dye and pyrrolopyrimidin-7-one azomethine dye of the present invention represented by the general formula (I) or (II) reddish or magenta, $R^7$ and $R^8$ each needs to be a group whose Hammett's substituent constant $\sigma p$ is less than 0.15.

In order to render the pyrrolopyrimidin-5-one azomethine dye and pyrrolopyrimidin-7-one azomethine dye of the present invention represented by the general formula (I) or (II) a near infrared-absorbing dye, $R^1$ needs to be an alkyl group, $-OR^{21}$ or $-NR^{22}-CO-R^{23}$.

$R^{21}$ represents an alkyl group, aryl group or heterocyclic group.

$R^{22}$ represents a hydrogen atom or alkyl group.

$R^{23}$ represents an alkyl group, aryl group, heterocyclic group, $-OR^{21}$ or $-NR^{22}R^{24}$.

$R^{24}$ represents a substituent which can be attached to the nitrogen atom.

At least one of $R^7$ and $R^8$ needs to be an electrophilic group whose Hammett's substituent constant $\sigma p$ is 0.15 or more.

The dye of the present invention represented by the general formula (III) can have various hues depending on the selection of $R^{11}$, $R^{12}$ and $R^{13}$. In order to render the dye of the present invention represented by the general formula (III) sharp in its absorption, at least one of $R^{11}$ and $R^{13}$ preferably has a Hammett's substituent constant $\sigma p$ of 0.3 or more, more preferably 0.4 or more.

In order to render the hue of the dye of the present invention represented by the general formula (III) cyan, the sum of Hammett's substituent constant $\sigma p$ of $R^{11}$, $R^{12}$ and $R^{13}$ is preferably from 1.0 to 2.50.

Specific examples of the dye of the present invention represented by the general formula (III) wherein $R^{11}$, $R^{12}$ and $R^{13}$ each has a Hammett's substituent constant $\sigma p$ of 0.30 or more will be given below.

Examples of an electrophilic group (or atom) whose Hammett's substituent constant $\sigma p$ is 0.30 or more include cyano group, nitro group, aliphatic or aromatic acyl group (e.g., formyl, acetyl, benzoyl), carbamoyl group (e.g., carbamoyl, methylcarbamoyl), phosphono group, alkoxycarbonyl group (e.g., methoxycarbonyl, ethoxycarbonyl, diphenylmethoxycarbonyl), phosphoryl group (e.g., dimethoxyphosphoryl, diphenylphosphoryl), aliphatic or aromatic sulfamoyl group (e.g., N-ethylsulfamoyl, N,N-dipropylsulfamoyl), aliphatic or aromatic sulfonyl group (e.g., trifluoromethanesulfonyl, difluoromethanesulfonyl, methanesulfonyl, benzenesulfonyl, toluenesulfonyl), and perfluoroalkyl group. Specific examples of $\sigma p$ values for these groups include 0.66 for cyano group, 0.78 for nitro group, 0.50 for acetyl group, 0.45 for methoxycarbonyl group, 0.72 for methanesulfonyl group, 0.54 for $CF_3$, and 0.36 for carbamoyl group.

Preferred among these groups are cyano group, aliphatic or aromatic sulfonyl group, aliphatic or aromatic acyl group, perfluoroalkyl group, carbamoyl group, and alkoxycarbonyl group. More preferred among these groups are cyano group, perfluoroalkyl group, and carbamoyl group.

The selection of substituents in the general formula (III) is most preferably such that preferred examples of each substituent are combined. More particularly, $R^1$ is a hydrogen atom, alkyl group, acylamino group, alkoxycarbonylamino group or aminocarbonylamino group, $R^2$, $R^3$ and $R^4$ each is a hydrogen atom, $R^{11}$ is an aryl group or electrophilic group whose Hammett's substituent constant $\sigma p$ is 0.3 or more, $R^{12}$ is an amino group, acyl group, alkoxycarbonyl group, aminocarbonyl group, aryloxycarbonyl group, alkyl group or aryl group, and $R^{13}$ is an alkyl group, aryl group, acylamino group, alkoxycarbonylamino group or aminocarbonylamino group.

If the dye of the present invention is to be dissolved in a lipophilic polymer or solvent, it is preferably unsubstituted by sulfonic group (including salts thereof), carboxylic group (including salts thereof), quaternary amino group, etc.

On the other hand, if the dye of the present invention is to be dispersed in gelatin or used in the form of aqueous solution, it is preferably substituted by sulfonic group (including salts thereof), carboxylic group (including salts thereof), quaternary amino group, etc.

If the dye of the present invention is to be used in heat transfer, the substituents are preferably selected such that the molecular weight of the dye is 700 or less, more preferably 600 or less.

If the dye of the present invention is represented by the general formula (I), those wherein $R^{10}$ is substituted exhibit an absorption maxima in a longer wavelength range and a broader absorption waveform than those wherein $R^{10}$ is unsubstituted.

On the other hand, those wherein $R^{10}$ is unsubstituted exhibit a higher fastness to heat or the like and a sharper absorption waveform than those wherein $R^{10}$ is substituted.

Accordingly, if the dye of the present invention is desired to exhibit a high fastness, those wherein $R^{10}$ is unsubstituted are preferably selected. Also if the dye of the present invention is desired to exhibit a sharp absorption waveform, those wherein $R^{10}$ is unsubstituted are preferably selected.

On the other hand, if the dye of the present invention is desired to exhibit absorption in a long wavelength range, those wherein $R^{10}$ is substituted are preferably selected.

Knowledges related to the present invention will now be discussed below.

Another approach for rendering the dye of the present invention a near infrared-absorbing dye is to introduce a substituent into both $R^1$ and $R^4$.

An azomethine dye is normally known to have its absorption wavelength range shifted to far long wavelength range and exhibit a reduced molecular absorptivity coefficient when a substituent is introduced into both the two ortho positions in the imino group in the benzene ring in the developing agent portion thereof.

This technique is described in *Photographic Science and Engineering*, Volume 8, No. 3, May–June 1964, page 125, etc.

The pyrrolopyrimidin-7-one azomethine dye and pyrrolopyrimidin-5-one azomethine dye of the present invention fall within the general rule of the azomethine dye and thus can have its absorption wavelength range shifted to a long wavelength range by the above mentioned method.

However, if the above mentioned method is used to shift the absorption wavelength range of the dye to a long wavelength range, the dye exhibits a remarkably reduced fastness to heat and light and thus is not suitable for the use in image formation or filter.

On the other hand, if the dye doesn't need to be fast to heat and light, it may have its absorption wavelength range shifted to a long wavelength range by the above mentioned method.

The $\sigma p$ value of substituents in dyes of the present invention, the absorption maxima wavelength of these dyes in ethyl acetate and their half value widths are tabulated below.

| Dye No. | $\sigma p$ Value | | | | Absorption maxima (nm) | Half value width (nm) |
|---|---|---|---|---|---|---|
| | $R^{11}$ | $R^{12}$ | $R^{13}$ | Sum of $R^{11}, R^{12}, R^{13}$ | | |
| 101 | 0.66 | 0.45 | 0.10 | 1.21 | 660 | 65 |
| 102 | 0.66 | 0.45 | 0.03 | 1.14 | 655 | 69 |
| 104 | 0.00 | 0.66 | −0.01 | 0.65 | 601 | 78 |
| 105 | −0.01 | 0.45 | 0.23 | 0.67 | 582 | 82 |
| 106 | 0.66 | 0.66 | −0.66 | 0.66 | 641 | 79 |
| 128 | 0.66 | 0.66 | 0.00 | 1.32 | 658 | 64 |
| 129 | 0.66 | 0.66 | −0.24 | 1.08 | 677 | 79 |
| 130 | 0.36 | 0.36 | −0.24 | 0.48 | 639 | 120 |
| 131 | 0.36 | 0.36 | 0.00 | 0.72 | 629 | 98 |

The greater the sum of $\sigma p$ values of $R^{11}$, $R^{12}$ and $R^{13}$ are, the longer is the absorption wavelength of the dyes of the present invention and the sharper is the absorption waveform of the dyes of the present invention. Dyes 101, 102, 128 and 129, which each has a total of 1.00 or more of the sum of $\sigma p$ values, exhibit a long absorption maxima wavelength as compared with the other dyes. This wavelegth is sufficient for cyan dye. Their half value widths are sufficiently small, showing that these dyes exhibit a sharp hue.

Paying out attention to $R^{11}$ and $R^{13}$, Dye 104, 105, 130 and 131, which have $\sigma$ value of less than 0.40, exhibit a large half value width as compared with those having $\sigma p$ value of not less than 0.40, showing that these dyes exhibit a broad absorption. This shows that at least one of $R^{11}$ and $R^{13}$ needs to be an electrophilic group having $\sigma p$ value of 0.40 or more to render the dyes of the present invention sharp in absorption.

It is also shown that Dyes 104 and 105, whose $R^{11}$ and $R^{13}$ each has $\sigma p$ value of less than 0.40 and whose $R^{12}$ is a cyano group or alkoxycarbonyl group, exhibit absoprtion in a slightly short wavelength range but exhibit a cyan hue.

Some explanation will now be given to Hammett's substituent constant as used herein. Hammett's rule is an empirical rule which was proposed by L. P. Hammett in 1935 to quantitatively discuss the effects of substituents on the reaction or equilibrium of benzene derivatives. This rule has been nowaday widely regarded as appropriate. Substituent constants determined by Hammett's rule include $\sigma p$ value and $\sigma m$ value. These values can be found in many references. For example, J. A. Dean, *Lange's Handbook of Chemistry*, 12th ed., 1979, McGraw-Hill, and *Kagaku no Ryoiki* (Domain of Chemistry), extra number, No. 122, pp. 96–103, 1979, Nankodo, detail these substitution constants. In the present invention, each substituent is defined or explained by Hammett's substituent constant $\sigma p$. However, this doesn't mean that each substituent is limited to those having known values found in these references. It goes without saying that there are included substituents whose substituent constant will fall within the above specified range as determined on the basis of Hammett's rule even if their substituent constant values are unknown in these references. The σp and σm values will be so defined hereinafter.

The dye of the present invention may contain an atom group having an effect of inhibiting discoloration in its molecule. This is desirable particularly when a high image fastness is required.

The atom group having an effect of inhibiting discoloration may be connected to any position in $R^1$, $R^2$, $R^3$, $R^4$, $R^5$, $R^6$, $R^7$, $R^8$, $R^9$, $R^{10}$, $R^{11}$, $R^{12}$ and $R^{13}$ in the dye.

As the atom group having an effect of inhibiting discoloration there can be used any of those described in Japanese Patent Application No. 2-277665.

Specific examples of the atom group having an effect of inhibiting discoloration will be given below, but the present invention should not be construed as being limited thereto.

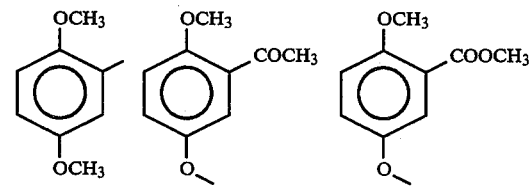

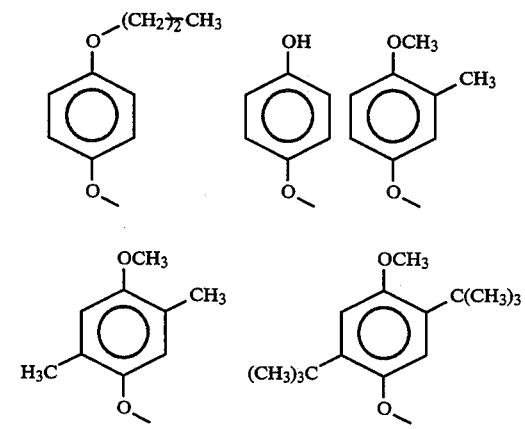

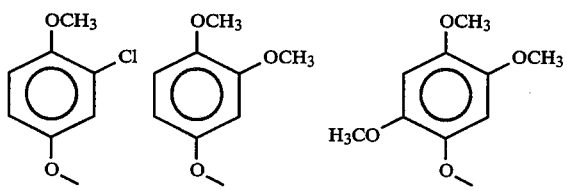

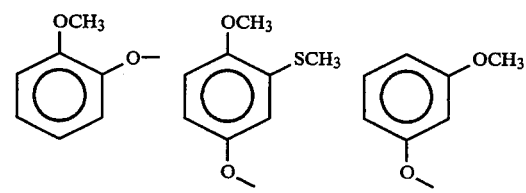

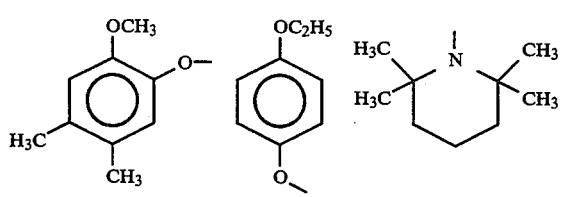

-continued

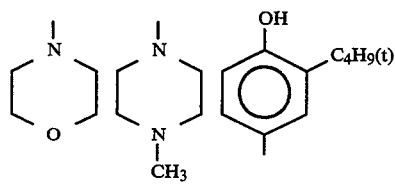

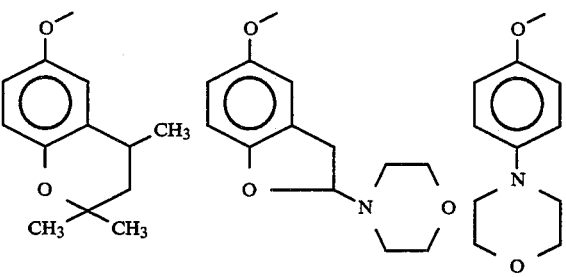

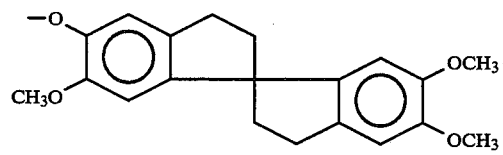

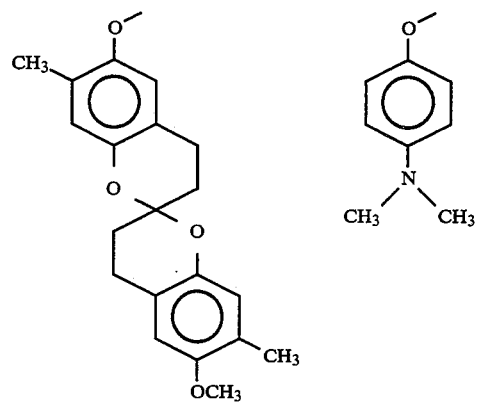

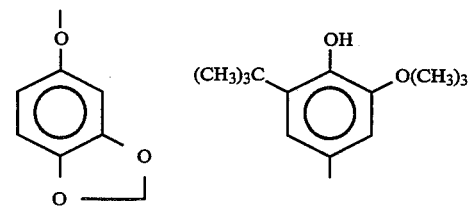

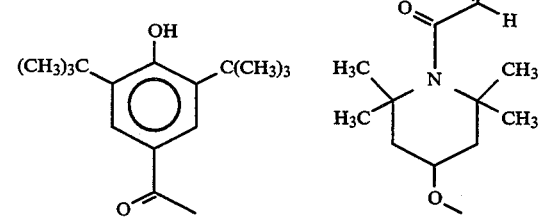

-continued
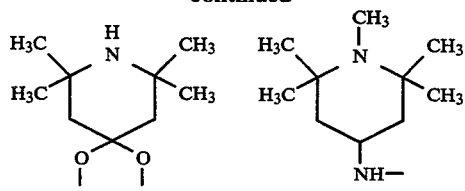
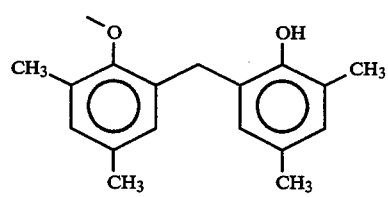
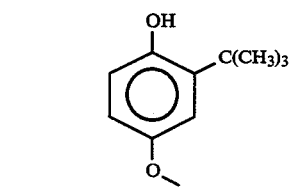
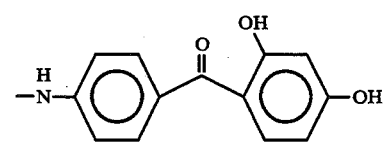
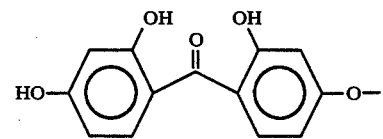
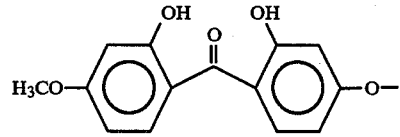
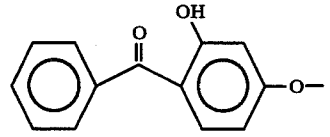
-continued
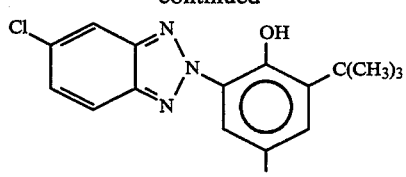
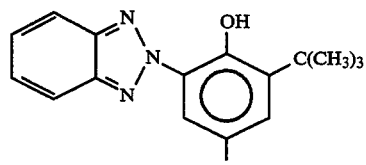
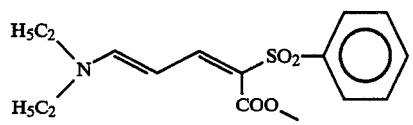
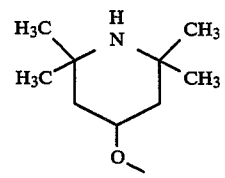
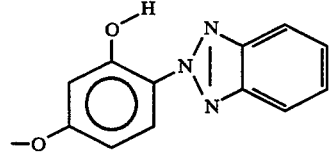
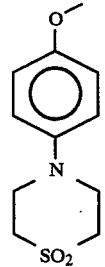
Specific examples of the dyes of the present invention will be given below. However, these examples are only for the purpose of explanation of the present invention and don't limit the present invention.
1.
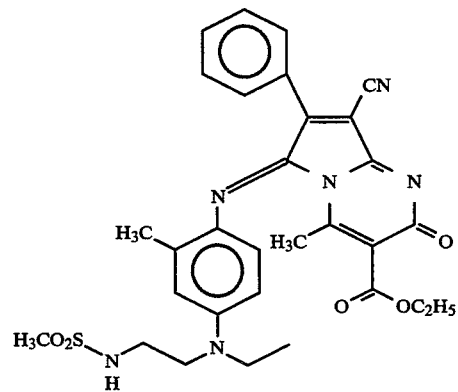
2.
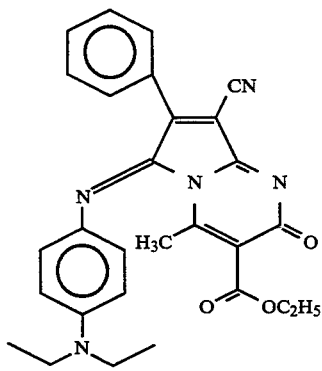

-continued
3.
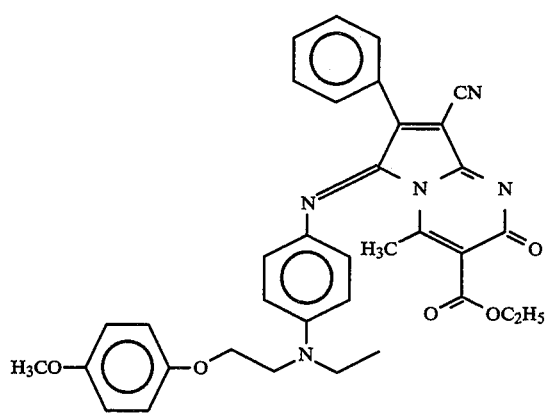
4.
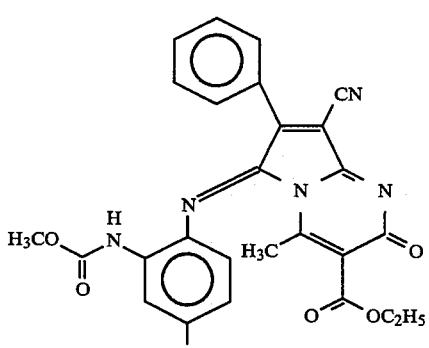
5.
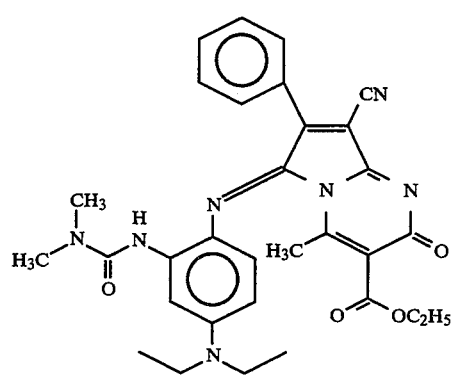
6.
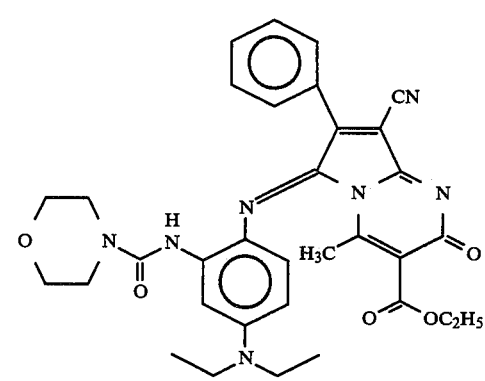
7.
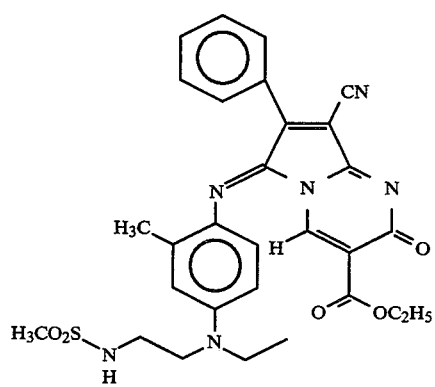
8.
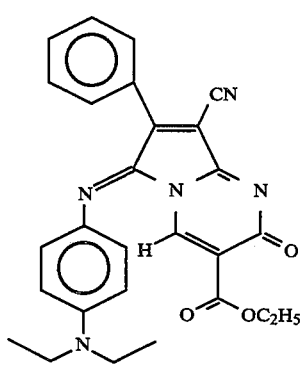
9.
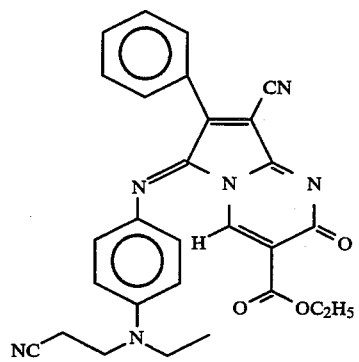
10.
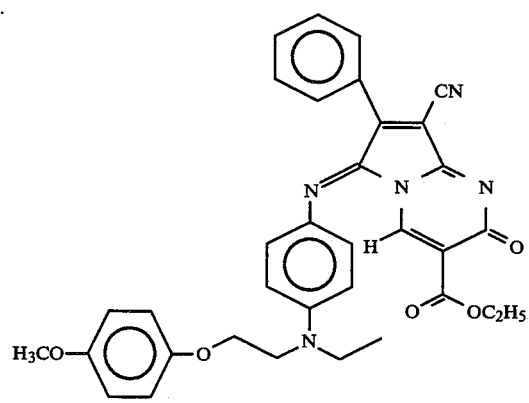

-continued
11.
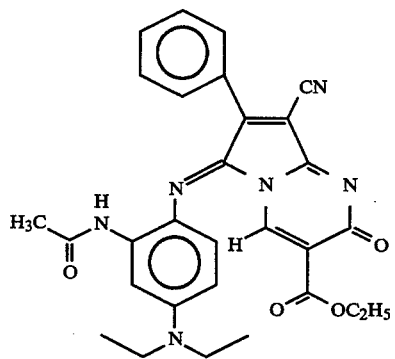
12.
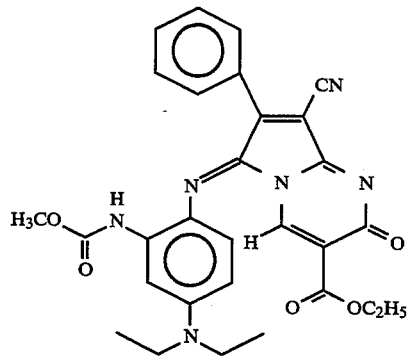
13.
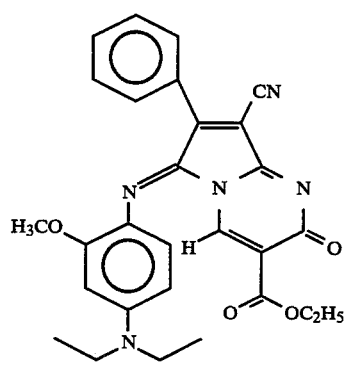
14.
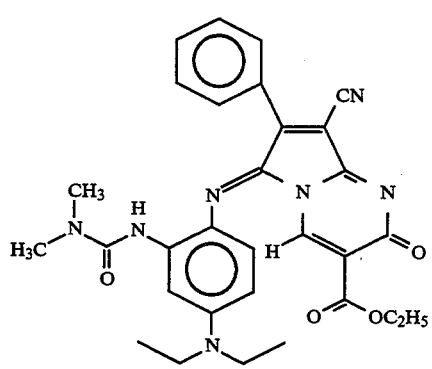
15.
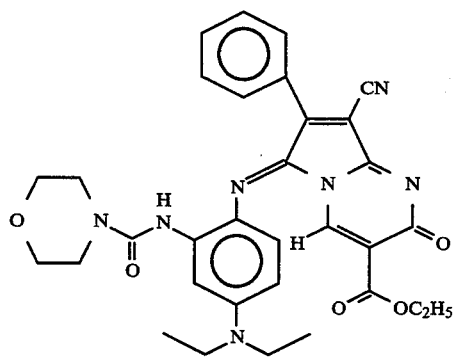
16.
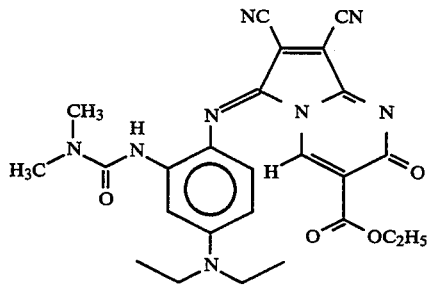
17.
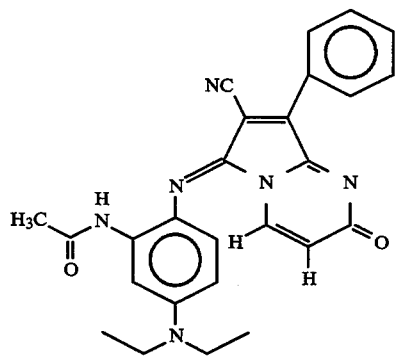
18.
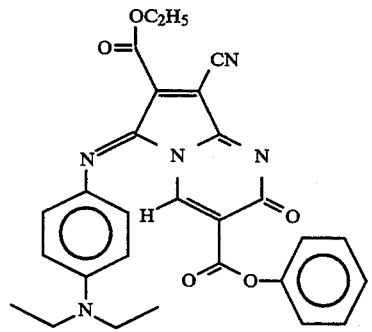

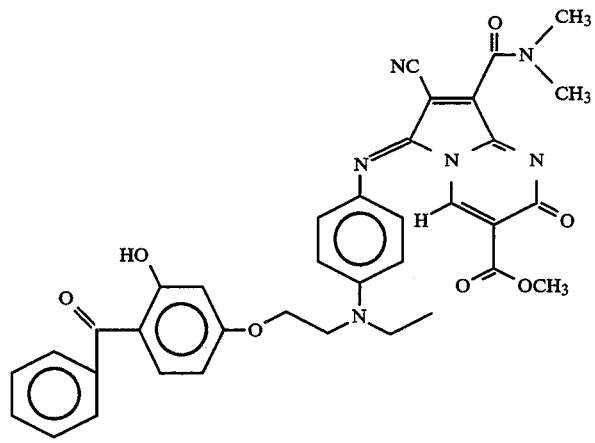
19.
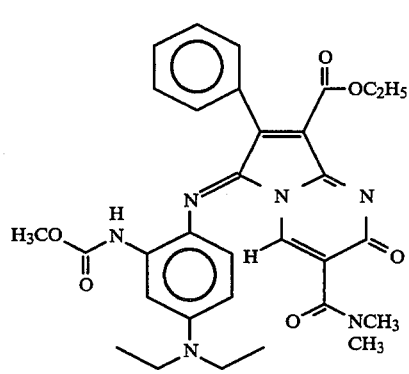
20.
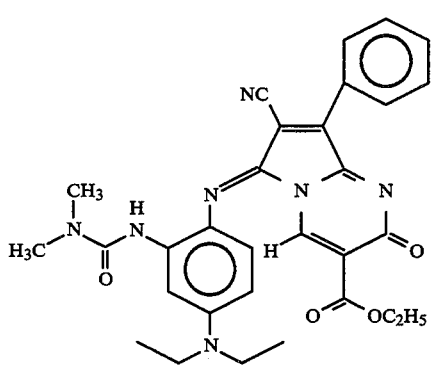
21.
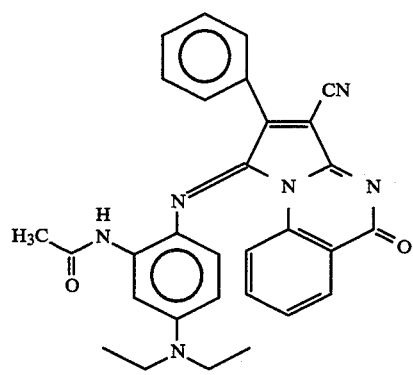
22.
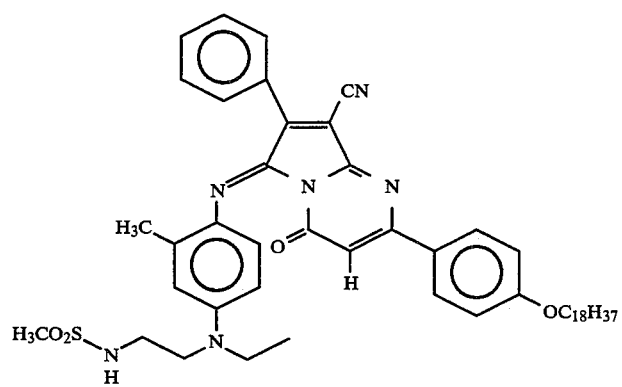
23.

-continued
24.
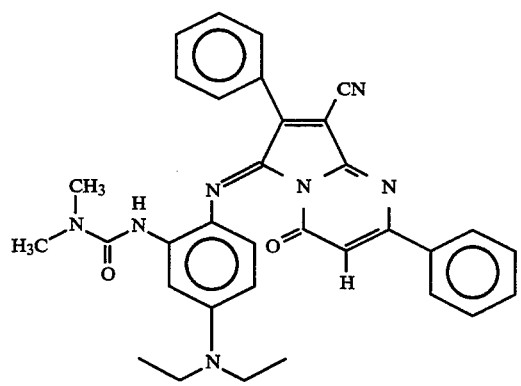
25.
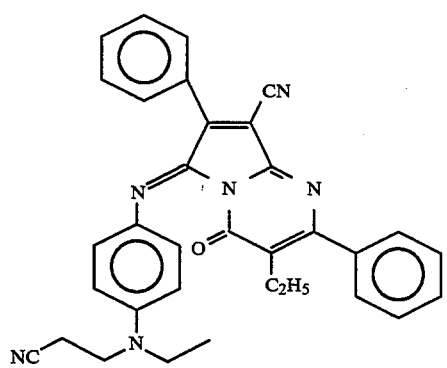
26.
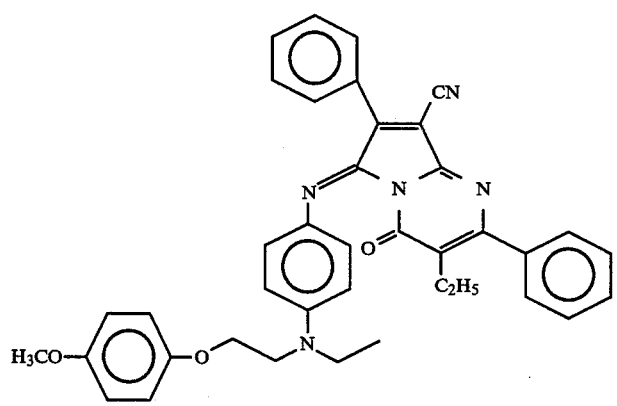
27.
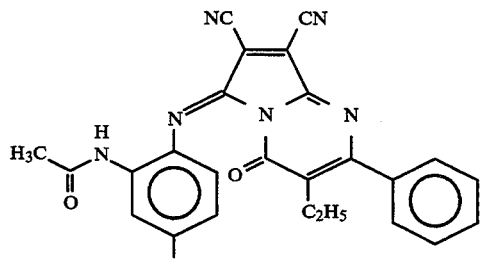
28.
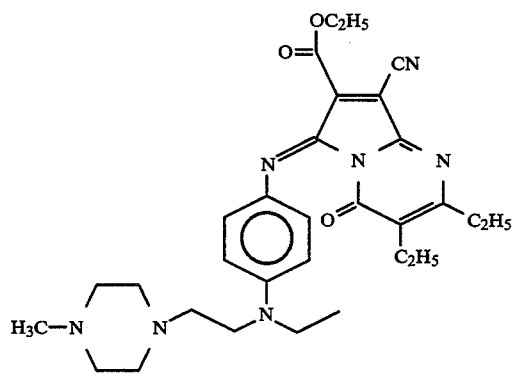
29.
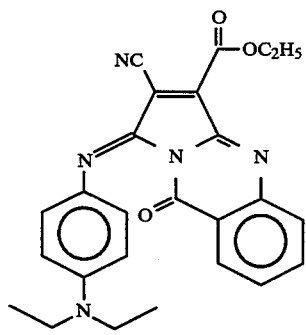
30.
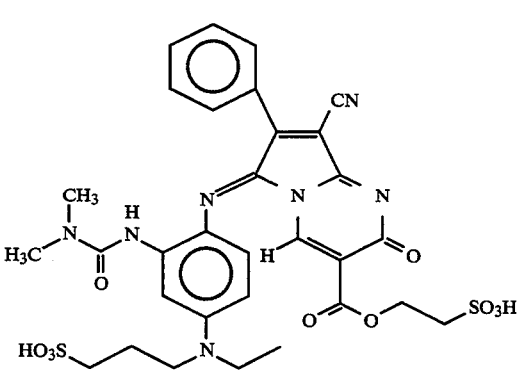

-continued
31.
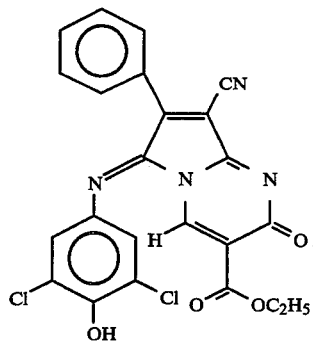
32.
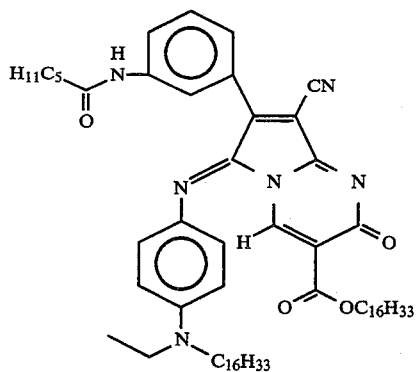
33.
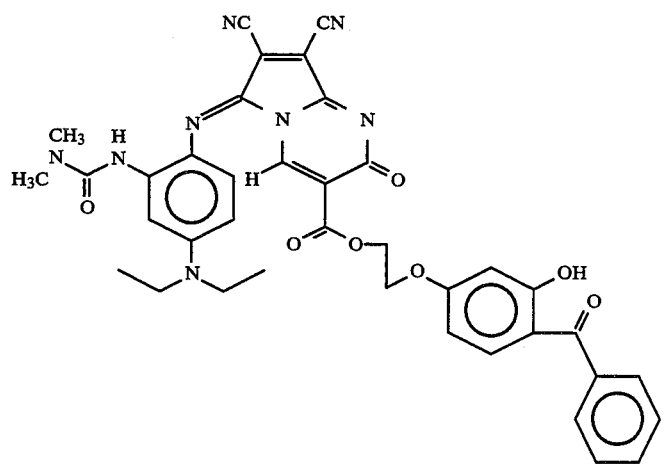
34.
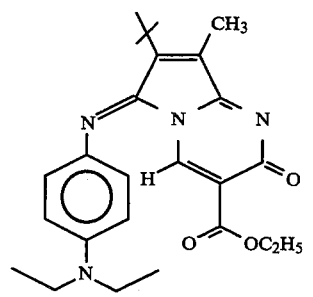
35.
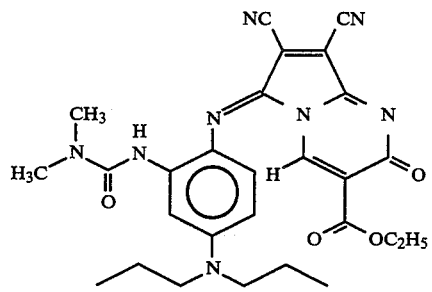
36.
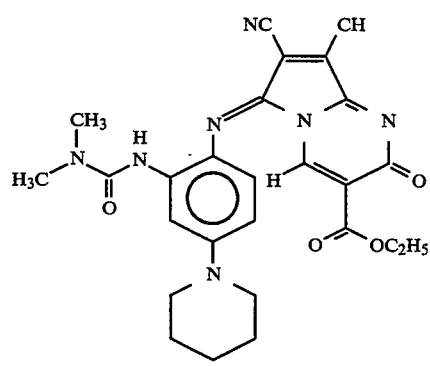
37.
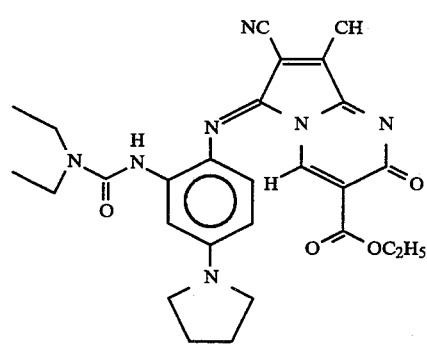

-continued
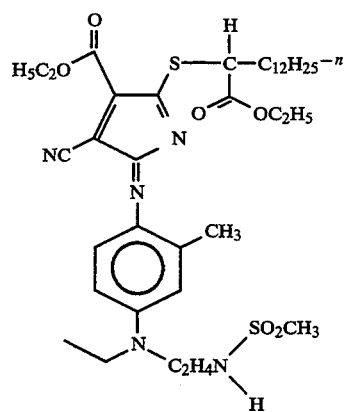
101.
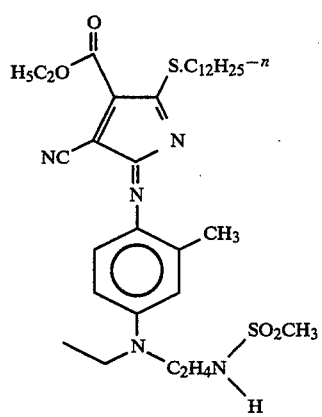
102.
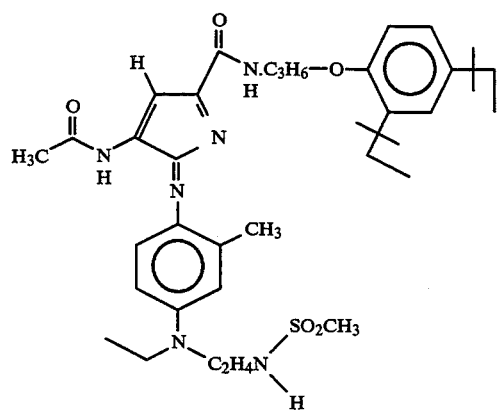
103.
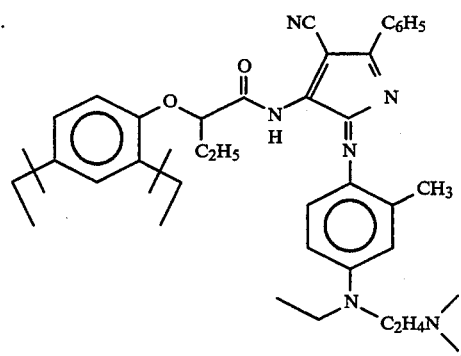
104.
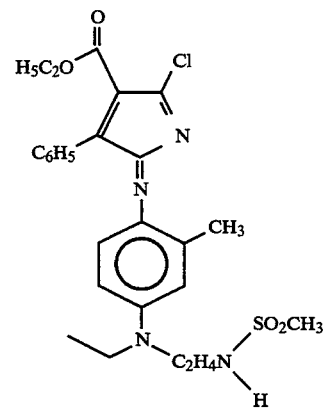
105.
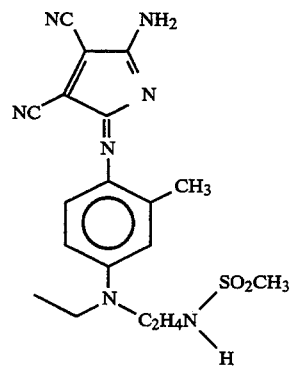
106.
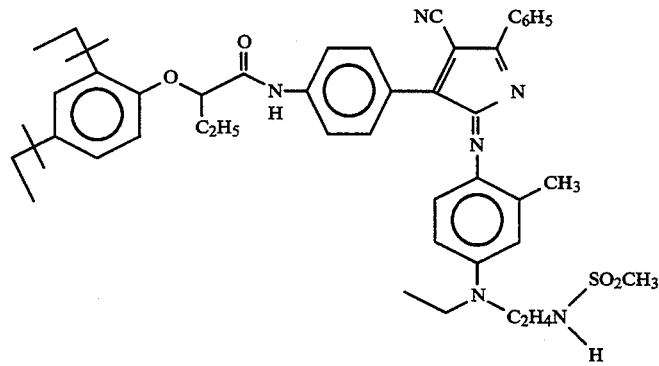
107.

-continued
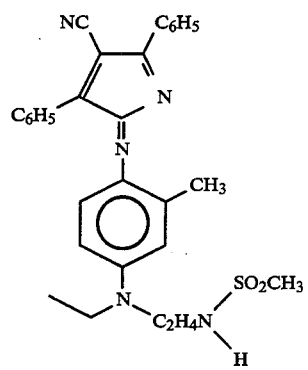 108.
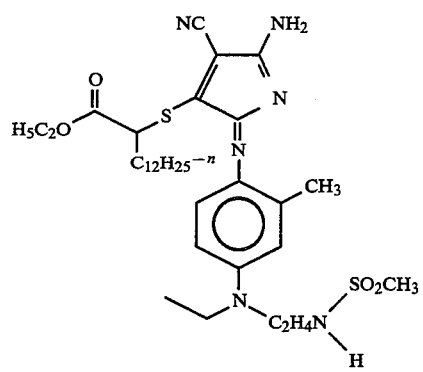 109.
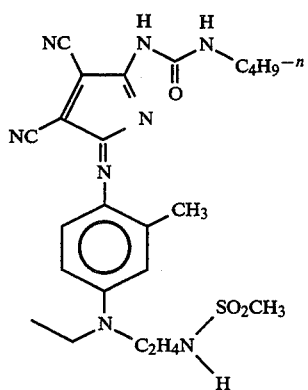 110.
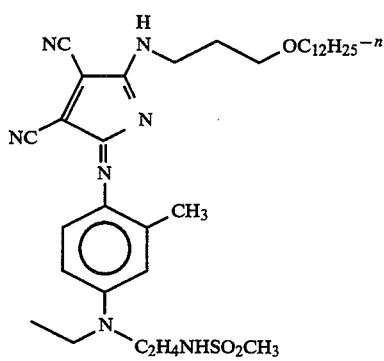 111.
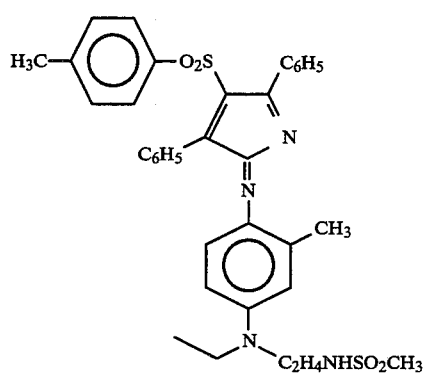 112.
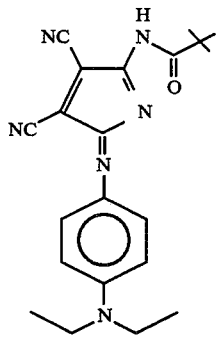 113.
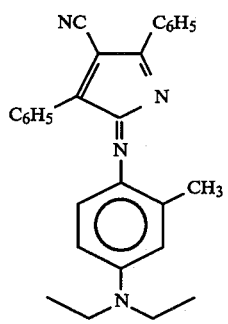 114.
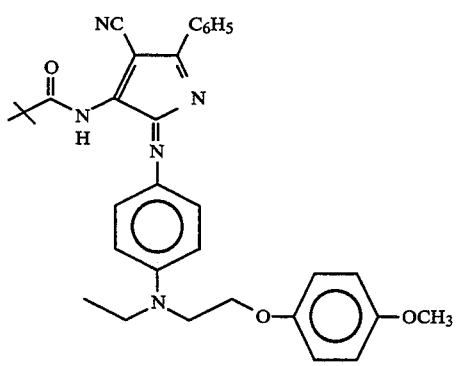 115.

-continued
116.
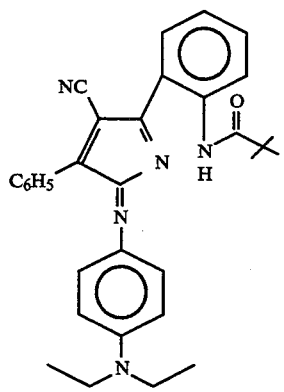
117.
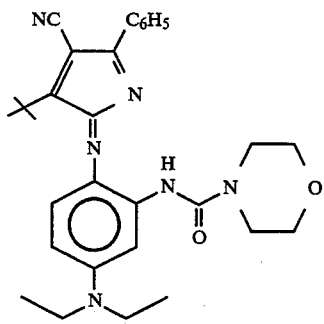
118.
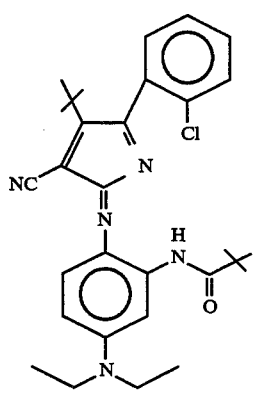
119.
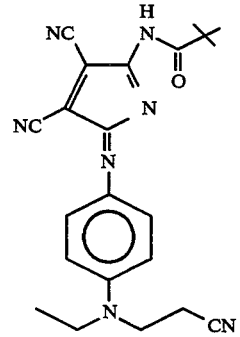
120.
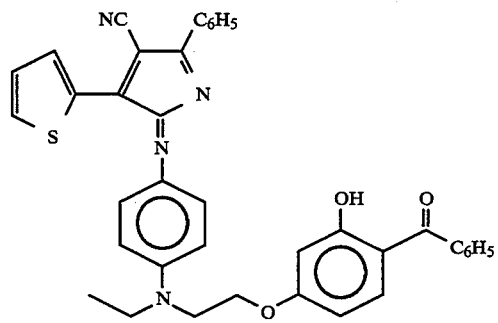
121.
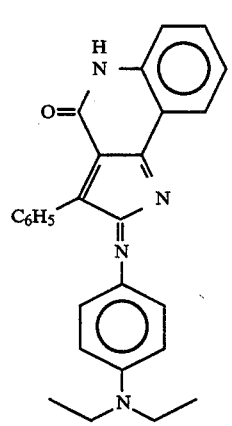
122.
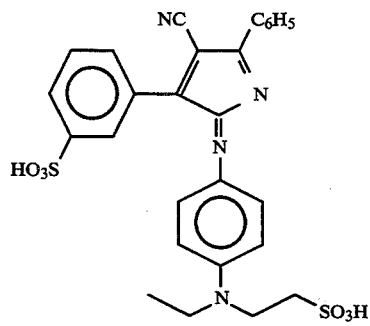
123.
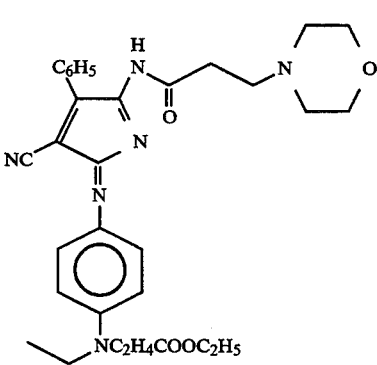

124. 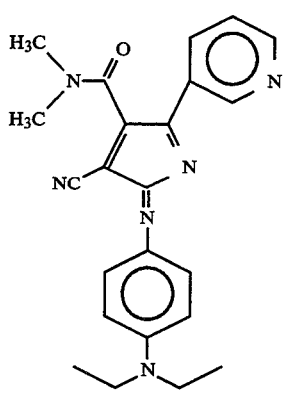
125. 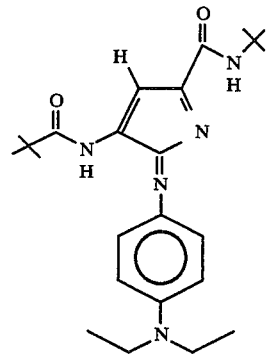
126. 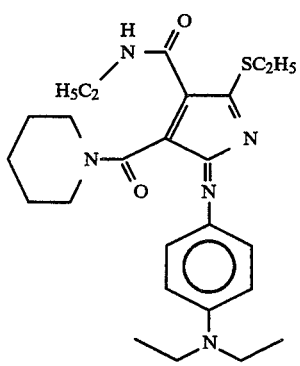
127. 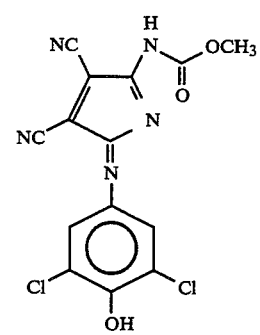
128. 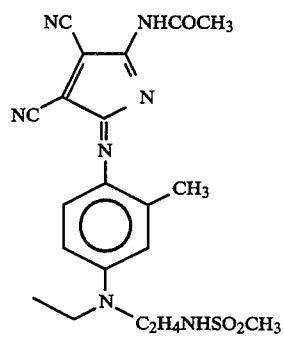
129. 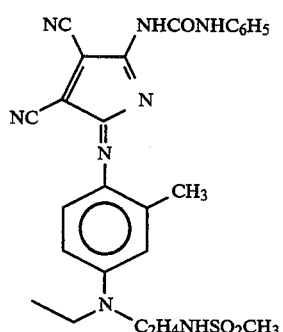
130. 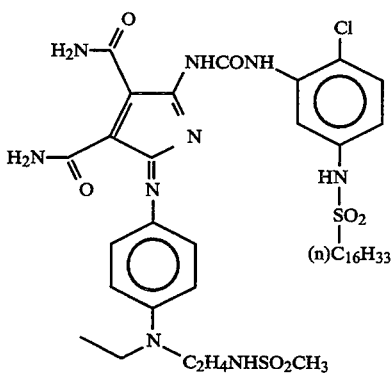
131. 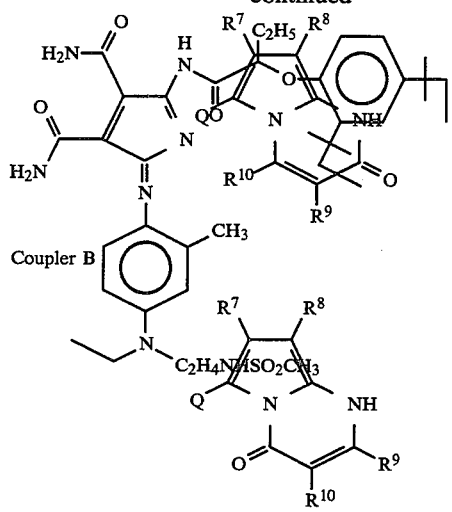
Coupler B
Developing agent C
The synthesis of the dye of the present invention represented by the general formula (I) or (II) can be accomplished by allowing the following Couplers A and B to undergo oxidative coupling with the following Developing Agent C:
Coupler A
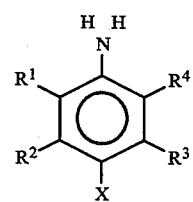

wherein Q represents a hydrogen atom or an eliminatable group which undergoes elimination during coupling reaction.

It goes without saying that Couplers A and B may be used in the form of tautomers.

Alternatively, the synthesis of the dye of the present invention represented by the general formula (I) or (II) can be accomplished by allowing Couplers A and B to undergo dehydration condensation with the following Compound D:

Compound D

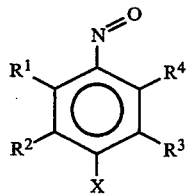

If X is OH, the synthesis can be accomplished by allowing Couplers A and B to undergo condensation with the following Compound E:

Compound E

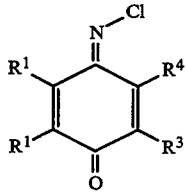

Couplers A and B can be easily synthesized from the corresponding pyrroles.

The synthesis of the dye of the present invention represented by the general formula (III) can be accomplished by allowing the following Coupler F to undergo oxidative coupling with the above mentioned Developing Agent C:

Coupler F

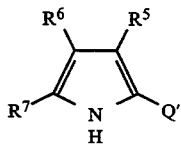

wherein Q' represents a hydrogen atom or an eliminatable group which undergoes elimination during coupling reaction.

It goes without saying that Coupler F may be used in the form of tautomer.

Alternatively, the synthesis of the dye of the present invention represented by the general formula (III) can be accomplished by allowing Coupler A to undergo dehydration condensation with the above mentioned Compound D. In this case, Q' is a hydrogen atom.

The synthesis of Coupler F can be accomplished by various known methods. For example, the reaction of TOSMIC (tosylmethyl isocyanate) derivative with an electrophilic olefin or the reaction of an azirine compound with β-diketone, β-ketonitrile or the like can be used.

The present invention will be further described with reference to the following examples of the synthesis of the dyes of the present invention.

SYNTHESIS EXAMPLE 1: Synthesis of Dye 1

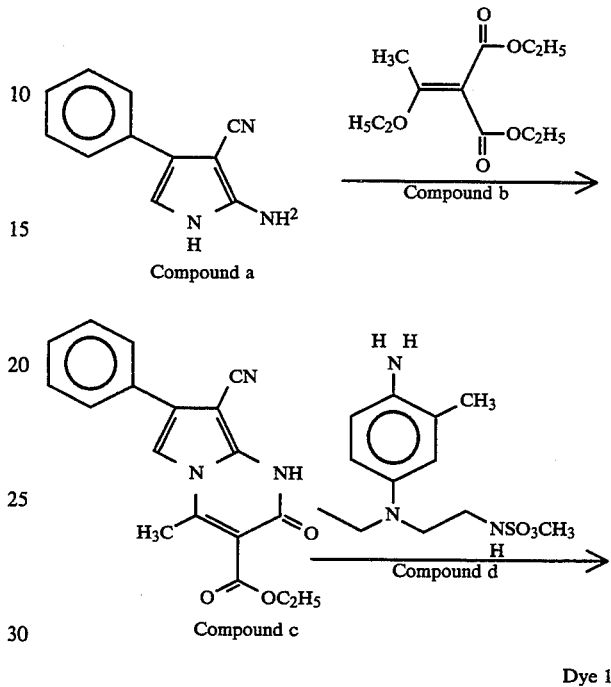

18.3 g of 2-amino-3-cyano-4-phenylpyrrole (Compound a) which is easily obtained by allowing 2-aminoacetophenone hydrochloride and malononitrile to undergo reaction in the presence of an alkali and 25.3 g of diethyl ethoxyethylidenemalonate (Compound b) were dispersed in 300 ml of ethanol. To the dispersion was added 22.0 ml of a 28% methanol solution of sodium methylate. The mixture was heated under reflux for 5 hours. After cooling, ethyl acetate was added to the material. The material was washed with water. The organic solvent was concentrated. A small amount of ethyl acetate was added to the material. The resulting crystal was then filtered off to obtain 11.6 g (yield: 36%) of Compound c.

To 0.64 g of Compound c were added 10 ml of ethyl acetate and 6 ml of ethanol. To the material was added an aqueous solution obtained by dissolving 1.5 g of sodium carbonate in 10 ml of water. To the material was added 1.5 g of Compound d. An aqueous solution obtained by dissolving 1.4 g of ammonium persulfate in 10 ml of water was then added dropwise to the material in 2 minutes. After dropwise addition, the material was stirred for 5 minutes. To the material were added ethyl acetate and water. The material was allowed to undergo separation. The resulting organic phase was washed with water. The solvent was distilled off to obtain a crude product which was then purified through a silica gel chromatography to obtain 0.65 g (yield: 55%) of Dye 1.

m.p.: begins to melt at 117° C. and becomes gummy at 120° C.

$^1$HNMR spectrum (200 MHz, in CDCl$_3$) 1.10 (t, 3H, J=6Hz), 1.40 (t, 3H, J=6Hz), 2.40 (s, 3H), 2.75 (s, 3H), 3.05 (s, 3H), 3.30 (m, 2H), 3.45 (m, 4H), 4.45 (q, 2H, J=6Hz), 5.30 (d, 1H, J=8Hz), 5.80 (d, d, 1H, J$_1$=8Hz, $J_2=2Hz$), 6.00 (d, 1H, $J=2Hz$), 6.55 (bs, 1H), 7.10 (m, 2H), 7.25 (m, 3H)

¹HNMR spectrum is indicated by the following abbreviations:
s = singlet
d = doublet
t = triplet
q = quadruplet
m = multiplet
bs = broad singlet SYNTHESIS EXAMPLE 2: Synthesis of Dye 2

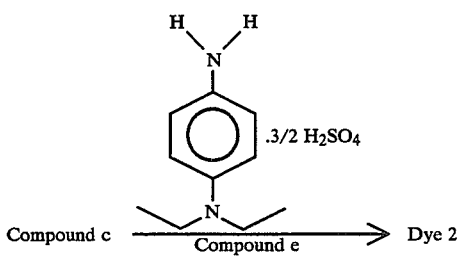

1.0 g of Compound c was dissolved in a mixture of 100 ml of ethyl acetate and 100 ml of water with stirring at a temperature of 20° C. 2.60 g of potassium carbonate and 20 ml of ethanol were added to the solution. 1.23 g of Compound e and ammonium persulfate were alternately added gradually to the solution. The reaction system was allowed to undergo reaction for 30 minutes. The reaction system was extracted. The resulting organic phase was twice washed with water, dried over magnesium sulfate, filtered out, and then distilled under reduced pressure in an evaporator to remove the solvent therefrom. The crude product was then purified through a silica gel column chromatography (ethyl acetate:hexane=1:10 to 1:2) to obtain 0.41 g (yield: 54.6%) of Dye 2.

m.p.: amorphous; showing no definite melting point
Mass spectrum (only peak values are given) 481, 461, 448, 446, 409, 249, 149

SYNTHESIS EXAMPLE 3: Synthesis of Dye 8

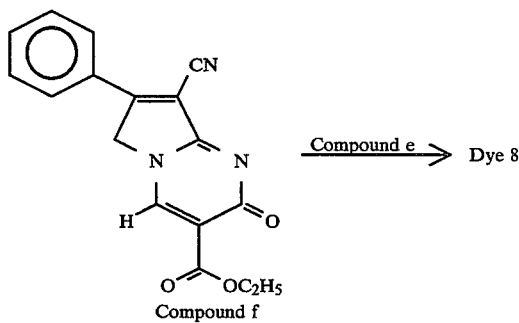

1.0 g of Compound f and 1.0 g of triethylamine were dissolved in 20 ml of methylene chloride. 0.66 g of N-bromosuccinimide and 0.98 g of Compound e were alternately added batchwise to the solution with stirring at a temperature of 20° C. The reaction system was allowed to undergo reaction for 30 minutes. The reaction system was then extracted with 50 ml of water and 50 ml of ethyl acetate.

The resulting organic phase was twice washed with water, dried over magnesium sulfate, filtered out, and then distilled under reduced pressure in an evaporator to remove the solvent therefrom.

The crude product was then purified through a silica gel column chromatography (ethyl acetate:hexane=1:10 to 1:2) to obtain 0.32 g (yield: 20.8%) of Dye 8.

Mass spectrum (only peak values are given) 467, 450, 237, 221, 149

SYNTHESIS EXAMPLE 4: Synthesis of Dye 12

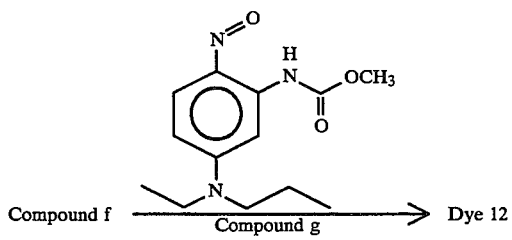

0.5 g of Compound f and 0.43 g of Compound g were dissolved in 10 ml of ethanol. 0.20 g of acetic anhydride was added to the solution with stirring at a temperature of 20° C. The reaction system was allowed to undergo reaction for 30 minutes. The reaction system was then extracted with 100 ml of water and 100 ml of ethyl acetate.

Crystallization occurred during the extraction. The crystal was then filtered off.

The crude product was then purified through a silica gel column chromatography (ethyl acetate:chloroform=1:4) to obtain 0.40 g (yield: 43.8%) of Dye 12.

m.p.: doesn't melt even at 210° C.

¹HNMR spectrum (200 MHz, in CDCl₃) 1.30 (t, 6H, $J=6Hz$), 1.40 (t, 3H, $J=6Hz$), 3.55 (q, 4H, $J=6Hz$), 3.80 (s, 3H), 4.40 (q, 2H, $J=6Hz$), 6.30 (d, d, 1H), 7.60 (m, 3H), 7.70 (d, d, 1H), 7.90 (m, 2H), 8.90 (bs, 1H)

SYNTHESIS EXAMPLE 5: Synthesis of Dye 23

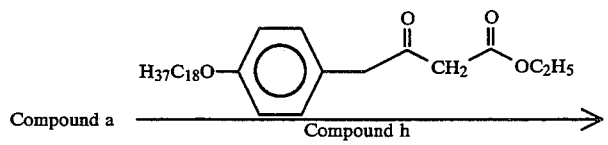

-continued

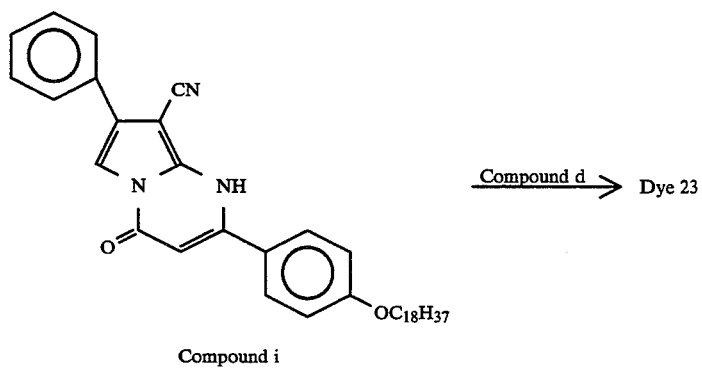

Compound i

Compound d ⟶ Dye 23

18.3 g of 2-amino-3-cyano-4-phenylpyrrole (Compound a) and 46.0 g of ethyl p-octadecyloxybenzoylacetate were dispersed in 300 ml of acetic acid. The reaction system was heated under reflux for 8 hours. After cooling, 1 l of ethyl acetate and 1 l of water were added to the reaction system. The resulting crystal was filtered off to obtain 29.0 g (yield: 50%) of Compound i (MW: 579).

To 1.16 g of Compound i were added 20 ml of ethyl acetate and 12 ml of ethanol. To the material was added a solution of 1.5 g of sodium carbonate in 10 ml of water. To the material was then added 1.5 g of Compound d. A solution of 1.4 g of ammonium persulfate in 10 ml was added dropwise to the material in 2 minutes. After dropwise addition, the material was then stirred for 5 minutes. Ethyl acetate and water were added to the material so that it underwent separation. The resulting organic phase was washed with water, and then distilled to remove the solvent therefrom to obtain a crude product which was then purified through a silica gel column chromatography to obtain 1.07 g (yield: 63%) of Dye 23.

m.p.: 166°–167° C.

$^1$HNMR spectrum (200 MHz, in CDCl$^3$) 0.90 (t, 3H, J=6Hz), 1.25 (t, 3H, J=6Hz), 1.30 (bs, 30H), 1.85 (t, t, 2H), 2.45 (s, 3H), 3.00 (s, 3H), 3.40 (t, 2H, J=6Hz), 3.50 (t, 2H, J=6Hz), 3.60 (t, 2H, J=6Hz), 4.05 (t, 2H, J=6Hz), 4.60 (t, 1H), 6.35 (d, 1H, J=8Hz), 6.60 (d, d, 1H, $J_1$=8Hz, $J_2$=2Hz), 6.70 (bs, 2H), 7.00 (d, 2H, J=8Hz), 7.60 (m, 3H), 8.05 (m, 2H), 8.10 (d, 2H, J=8Hz)

Mass spectrum (only main peaks are given) 845, 740, 739, 580, 579, 271, 163

SYNTHESIS EXAMPLE 6: Synthesis of Dye 7

18.3 g of 2-amino-3-cyano-4-phenylpyrrole (Compound a) and 24.0 g of diethyl ethoxymethylenemalonate were dispersed in 400 ml of ethanol. To the dispersion was added 22.0 ml of a 28% methanol solution of sodium methylate. The reaction system was heated under reflux for 1 hour. After cooling, the resulting crystal was filtered off to obtain 28.0 g (yield: 91%) of Compound f (MW: 307).

To 0.62 g of Compound f were added 10 ml of ethyl acetate and 6 ml of ethanol. To the material was added a solution of 1.5 g of sodium carbonate in 10 ml of water. To the material was added 1.5 g of Compound d. A solution of 1.4 g of ammonium persulfate in 10 ml of water was then added dropwise to the material in 2 minutes. After dropwise addition, the material was stirred for 5 minutes. Ethyl acetate and water were added to the material so that it underwent separation. The resulting organic phase was washed with water, and then distilled to remove the solvent therefrom to obtain a crude product which was then purified through a silica gel column chromatography to obtain 0.98 g (yield: 85%) of Dye 7.

m.p.: 210°–213° C.

$^1$HNMR spectrum (200 MHz, in CDCl$_3$) 1.25 (t, 3H, J=6Hz), 1.40 (t, 3H, J=6Hz), 2.40 (s, 3H), 3.00 (s, 3H), 3.35 (q, 2H), 3.60 (m, 4H), 4.35 (q, 2H, J=6Hz), 5.45 (t, 1H), 6.35 (d, 1H, J=8Hz), 6.55 (d, d, 1H, $J_1$=8Hz, $J_2$=2Hz), 6.75 (d, 1H, J=2Hz), 7.60 (m, 3H), 8.10 (m, 2H), 8.90 (s, 1H)

Mass spectrum (only main peaks are given) 574, 466, 392, 364, 307, 262, 211

SYNTHESIS EXAMPLE 7: Synthesis of Dye 102

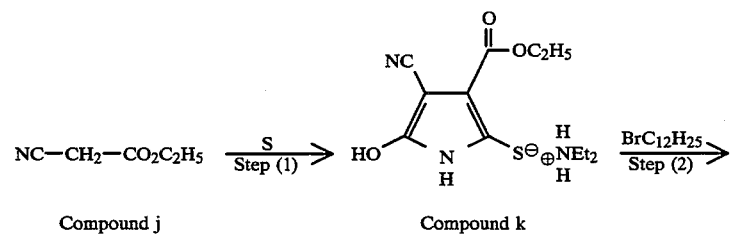

Compound j          Compound k

-continued

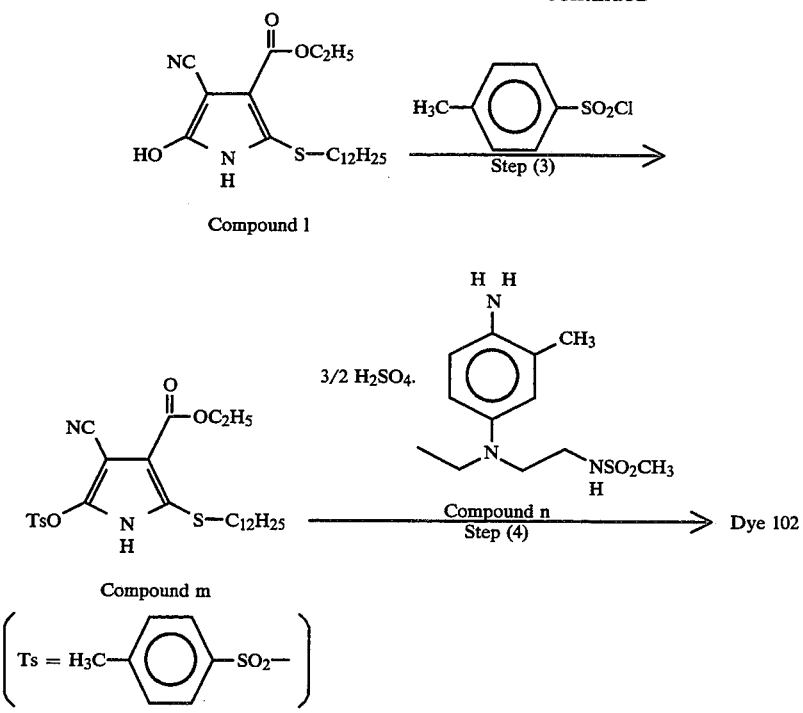

60 g of diethylamine was added dropwise to 92 g of Compound j, 19.2 g of powdered sulfur, and 60 ml of dimethylformamide with stirring at room temperature.

As a result, powdered sulfur was gradually dissolved, and the reaction solution turned brown. The reaction solution was stirred for 10 hours. The resulting crystal was filtered off to obtain 90.0 g of Compound k in the form of yellow crystal.

(Step 2)

88.3 g of n-dodecane bromide was added dropwise to 81.6 g of Compound k, 100 ml of dimethylformamide and 400 ml of ethyl acetate with stirring at room temperature. Since the dissolution was not complete, 150 ml of dimethylformamide was further added to the reaction system.

The reaction system was stirred for 3 hours. The reaction system was then extracted with 500 ml of water and 500 ml of ethyl acetate. The resulting organic phase was washed twice with water, washed once with saturated brine, and then dried over magnesium sulfate.

The material was filtered out, and then distilled under reduced pressure in an evaporator to obtain 134.3 g of Compound l.

Compound l was allowed to stand for crystallization.
(Step 3)

5.52 g of tosyl chloride was added to 10 g of Compound l, 4.0 ml of triethylamine and 30 ml of dimethylformamide with stirring at room temperature.

After 5 hours of stirring, the reaction system was extracted with 100 ml of water and 100 ml of ethyl acetate. The resulting organic phase was washed twice with water, and then washed once with saturated brine.

The material was dried over magnesium sulfate, fitered out, and then distilled under reduced pressure in an evaporator to remove the solvent therefrom.

The resulting product was then purified through a silica gel column chromatography (hexane:ethyl acetate=10:3) to obtain 10.65 g of Compound m in the form of light brown oily matter.

(Step 4)

A solution of 2.0 g of Compound n and 1.0 g of ammonium persulfate in 10 ml of water was added to 2.0 g of Compound m, 10 g of potassium carbonate, 50 ml of water, 50 ml of ethyl acetate, and 5 ml of methanol with stirring at room temperature. To the material was added 0.6 g of N-chlorosuccinimide. The material was then stirred for 30 minutes.

The material was then extracted with 50 ml of ethyl acetate and 50 ml of water. The resulting organic phase was washed with water, dried over magnesium sulfate, filtered out, and then distilled under reduced pressure in an evaporator to remove the solvent therefrom.

The resulting crude product was then purified through a silica gel column chromatography (hexane:ethyl acetate=1:1 to 5:6) to obtain 1.73 g of Dye 102 as a purified matter.

The dyes of the present invention can be used in a process which comprises color development of a silver halide photographic material containing a coupler as one of the synthesis materials with a processing solution containing a developing agent as the other to imagewise produce a dye. The dyes of the present invention can also be used in a process which comprises previously produce a dye to be used for the formation of an image.

The dyes of the present invention can be used as image-forming dyes. Typical examples of its uses include dyes-to be contained in printing ink, dyes for hot melt type heat transfer process, dyes for heat migration type heat transfer process, and dyes for ink jet process.

The dyes of the present invention can also be used as dyes for filter. Typical examples of its uses include filter dyes for silver salt system photography, irradiation inhibiting dyes, filter dyes for solid image pick-up tube, and dyes for micro color filter for use in color liquid crystal television, etc.

In particular, a light-sensitive material in which infrared rays from a semiconductor laser are imagewise applied to a spectrally sensitized silver halide has been extensively studied in recent years. This type of a light-sensitive material needs a filter dye having absorption in the near infrared region. The dyes of the present invention can be preferably used in such an application.

The dye of the present invention is incorporated in a dye providing layer on a support to form a heat transfer dye providing material which is used for the image formation in the heat transfer recording process.

The use of the present invention in the image formation in the heat transfer recording process will be further described hereinafter.

In order to form a multi-color image, three color dyes, i.e., yellow, magenta and cyan dyes are needed.

The compound of the present invention can be used as cyan dye or magenta dye and two other color dyes can be selected from known dyes to form a multi-color image. Alternatively, a cyan dye, a magenta dye and another color dye can be selected from the dyes of the present invention and a yellow dye can be selected from known dyes.

For the same color, a dye of the present invention and known dyes may be used in admixture. Two or more kinds of dyes of the present invention can be used in admixture as the same color dye.

The use of the dye of the present invention as a heat migrating dye will be described hereinafter.

The heat transfer dye providing material can be used in the form of sheet, continuous roll or ribbon. The cyan dye and magenta dye of the present invention and yellow and other dyes to be used in combination therewith are normally located on a support in such an arrangement that they each form an independent region. For example, a yellow dye region, a magenta dye region and a cyan dye region may be sequentially horizontally or vertically laminated on a support. Alternatively, the above mentioned yellow dye, magenta dye and cyan dye may be provided on separate supports to prepare three kinds of heat transfer dye providing materials from which dyes are sequentially heat-transferred to one heat transfer image-receiving material.

The cyan dye and magenta dye of the present invention and yellow dye to be used in combination therewith can be coated on a support in the form of solution or dispersion in a proper solvent with a binder resin or can be printed on a support by a printing process such as gravure coating process. The dry thickness of the dye providing layer containing these dyes is normally set to the range of about 0.2 to 5 $\mu$m, particularly 0.4 to 2 $\mu$m.

The coated amount of the heat migrating dye is preferably in the range of 0.03 to 1.0 g/m$^2$, particularly 0.1 to 0.6 g/m$^2$.

As the binder resin to be used in combination with the above mentioned dye there can be selected any binder resin known for such a purpose which normally exhibits a high heat resistance and doesn't inhibit the migration of the dye on heating. Examples of such a binder resin include polyamide resin, polyester resin, epoxy resin, polyurethane resin, polyacrylic resin (e.g., polymethyl methacrylate, polyacrylamide, polystyrene-2-acrylonitrile), vinyl resin such as polyvinylpyrrolidone, polyvinyl chloride resin (e.g., vinyl chloridevinyl acetate copolymer), polycarbonate resin, polystyrene, polyphenylene oxide, cellulose resin (e.g., methyl cellulose, ethyl cellulose, carboxymethyl cellulose, cellulose acetate hydrogen phthalate, cellulose acetate, cellulose acetate propionate, cellulose acetate butyrate, cellulose triacetate), polyvinyl alcohol resin (e.g., partially-saponified polyvinyl alcohol such as polyvinyl alcohol, polyvinyl acetal and polyvinyl butyral), petroleum resin, rosin derivative, coumarone-indene resin, terpene resin, and polyolefin resin (e.g., polyethylene, polypropylene).

In the present invention, such a binder resin may be preferably used in the amount of about 20 to 600 parts by weight based on 100 parts by weight of dye.

In the present invention, as an ink solvent for dissolving or dispersing the above mentioned dye and binder resin therein there can be used a known ink solvent.

As the support for the heat transfer dye providing material there can be used any known material. Examples of such a material include polyethylene terephthalate, polyamide, polycarbonate, glassine paper, capacitor paper, cellulose ester, fluoropolymer, polyether, polyacetal, polyolefin, polyimide, polyphenylene sulfide, polypropylen, polysulfone, and cellophane.

The thickness of the support for the heat transfer dye providing material is normally in the range of 2 to 30 $\mu$m.

In order to prevent the thermal head from sticking to the dye providing material, a slipping layer may be provided. The slipping layer comprises a lubricating substance containing or free of polymer binder such as surface active agent, solid or liquid lubricant or mixture thereof.

In order to prevent the thermal head from sticking to the dye providing material due to heat and provide better slipperiness when printed on its back side, the dye providing material is preferably subjected to anti-sticking treatment on the side opposite the dye providing layer.

For example, a heat-resistant slipping layer comprising 1) a reaction product of polyvinyl butyral resin and isocyanate, 2) an alkali metal salt or alkaline earth metal salt of phosphoric ester, and 3) a filler is preferably provided. As such a polyvinyl butyral resin there can be preferably used such a resin having a molecular weight of about 60,000 to 200,000 and a glass transition point of 80° C. to 110° C. or such a resin whose vinyl butyral portion is in the proportion of 15 to 40% by weight in the light of the number of sites of reaction with isocyanate. As the alkali metal salt or alkaline earth metal salt of phosphoric ester there can be used Gafac RD720 produced by Toho Chemical Industry Co., Ltd. Such a material is used in an amount of 1 to 50% by weight, preferably 10 to 40% by weight based on the weight of polyvinyl butyral resin.

The heat-resistant slipping layer preferably exerts its heat resisting effect upon its underlayers. Such a heat-resistant slipping layer can be formed by coating a combination of a thermosetting synthetic resin and its hardener such as combination of polyvinyl butyral and polyhydric isocyanate, combination of acrylic polyol and polyhydric isocyanate, combination of cellulose acetate and titanium chelating agent and combination of polyester and organic titanium compound.

The dye providing material may optionally comprise a hydrophilic barrier layer for preventing the dye from diffusing toward the support. The hydrophilic dye barrier layer comprises a hydrophilic substance useful for the intended purpose. In general, excellent results can be obtained by the use of gelatin, poly(acrylamide), poly(isopropylacrylamide), butyl methacrylate-grafted gelatin, ethyl methacrylate-grafted gelatin, cellulose monoacetate, methyl cellulose, poly(vinyl alcohol), poly(ethyleneimine), poly(acrylic acid), mixture of poly(vinyl alcohol) and poly(vinyl acetate), mixture of poly(vinyl alcohol) and poly(acrylic acid) or mixture of cellulose monoacetate and poly(acrylic acid). Particularly preferred among these hydrophilic substances are poly(acrylic acid), cellulose monoacetate, and poly(vinyl alcohol).

The dye providing material may comprise a subbing layer. In the present invention, any subbing layer which exerts the desired effects can be used. Specific preferred examples of such a material include acrylonitrile/vinylidene chloride/acrylic acid copolymer (weight proportion: 14:80:6), butyl acrylate/2-aminoethyl methacrylate/2-hydroxyethyl methacrylate copolymer (weight proportion: 30:20:50), linear/saturated polyester such as Bostic 7650 (Emheart, Bostic Chemical Group), and chlorinated high density poly(ethylene-trichloroethylene) resin. The coated amount of the subbing layer is not specifically limited but is normally in the range of 0.1 to 2.0 g/m².

In acordance with the present invention, heat energy is applied by a heating means such as thermal head to a lamination of the heat transfer dye providing material and the heat transfer image-receiving material on either side, preferably on the back side of the heat transfer dye providing material depending on the image data. In this manner, the dye on the dye providing layer can be transferred to the heat transfer image-receiving material depending on the magnitude of heating energy to obtain a color image with excellent sharpness and high definition and gradation. A discoloration inhibitor can be similarly transferred.

The heating means is not limited to thermal head. For example, known means such as laser (e.g., semiconductor laser), infrared flash and thermal pen can be used.

In the case where laser is used as the heat source, the heat transfer dye providing material may preferably comprise a material which strongly absorbs laser. When the heat transfer dye providing material is irradiated with laser, the laser-absorbing material converts the light energy to a heat energy which is then transferred to the nearest dye until it is heated to a temperature high enough to cause it to migrate to the heat transfer dye providing material.

The laser-absorbing material may be present under the dye in a layer form and/or mixed with the dye.

This process is further described in British Patent 2,083,726A.

As the above mentioned laser there can be used various lasers such as ion gas laser (e.g., argon, krypton), metallic vapor laser (e.g., copper, gold, cadmium), solid laser (e.g., ruby, YAG), or semiconductor laser which emitts light in the infrared region of 750 nm to 870 nm (e.g., Ga-As).

Preferred among these lasers is semiconductor laser in the light of size, cost, stability, reliability, durability and ease of modulation.

Specific examples of semiconductor laser include Laser Model SDL-2420-H2 (a registered trademark) produced by Spectrodiode Labs, and Laser Model SLD-304v/w (a registered trademark) produced by Sony Corporation.

In the present invention, the heat transfer dye providing material can be combined with a heat transfer image-receiving material to give application in printing or facsimile using various thermal printers or image printing or printing image from television or CRT screen by magnetic recording process, magneto-optical recording process, photo recording process, etc.

For the details of heat transfer recording process, reference can be made to JP-A-60-34895.

The heat transfer image-receiving material to be used in combination with the heat transfer dye providing material of the present invention comprises a support having thereon an image-receiving layer for receiving a dye which has migrated from the dye providing material. The image-receiving layer is preferably a film having a thickness of about 0.5 to 50 $\mu$m containing singly or in combination with other binder substances a heat migrating dye-receiving substance which receives and is dyed with a heat migrating dye that has migrated from the heat transfer dye providing material upon printing. Examples of polymers as typical examples of such a heat migrating dye-receiving substance include the following resins:

(a) Resins having ester bond

Examples of such resins include polyester resins obtained by the condensation of dicarboxylic component such as terephthalic acid, isophthalic acid and succinic acid (these dicarboxylic acid components may be substituted by sulfonic group, carboxyl group, etc.) with ethylene glycol, diethylene glycol, propylene glycol, neopentyl glycol, bisphenol A, or the like; polyacrylic ester resins or polymethacrylic ester resins such as polymethyl methacrylate, polybutyl methacrylate, polymethyl acrylate and polybutyl acrylate; polycarbonate resins; polyvinyl acetate resins; styrene acrylate resins; and vinyltoluene acrylate resins. Specific examples of these resins include those described in JP-A-59-101395, JP-A-63-7971, JP-A-63-7972, JP-A-63-7973, and JP-A-60-294862. As commercial resins there can be used Vylon 290, Vylon 200, Vylon 280, Vylon 300, Vylon 103, Vylon GK-140, and Vylon GK-130 produced by Toyobo Co., Ltd., and ATR-2009 and ATR-2010 produced by Kao Corporation.

(b) Resins having urethane bond
   Polyurethane resins, etc.

(c) Resins having amide bond
   Polyamide resins, etc.

(d) Resins having urea bond
   Urea resins, etc.

(e) Resins having sulfone bond
   Polysulfone resins, etc.

(f) Resins having high polarity bond
   Polycaprolactone resins, styrene-maleic anhydride resins, polyvinyl chloride resins, polyacrylonitrile resins, etc.

In addition to these synthetic resins, mixtures or copolymers thereof can be used.

In the heat transfer image-receiving material, particularly in the image-receiving layer, can be incorporated a high boiling organic solvent or heat solvent as a substance capable of receiving a heat migrating dye or a dye diffusion aid.

Specific examples of such a high boiling organic solvent and heat solvent include compounds as described in JP-A-62-174754, JP-A-62-245253, JP-A-61-209444, JP-A-61-200538, JP-A-62-8145, JP-A-62-9348, JP-A-62-30247, and JP-A-62-136646.

The image-receiving layer in the heat transfer image-receiving material may carry a substance capable of receiving a heat migrating dye in the form of dispersion in a water-soluble binder. As the water-soluble binder to be used in this arrangement there can be used any known water-soluble polymer. A water-soluble polymer containing a group which can undergo crosslinking reaction by a film hardener may be preferably used.

The image-receiving layer may consist of two or more layers. This layer structure is preferably arranged such that the layer closest to the support contains a synthetic resin having a low glass transition point or a high boiling organic solvent or heat solvent to enhance its dyeability with dyes while the outermost layer contains a synthetic resin having a higher glass transition point or a mimimum required amount of a high boiling organic solvent or heat solvent or no such solvents to inhibit failures such as surface stickiness, adhesion to other substances, re-transfer to other substances after transfer and blocking with the heat transfer dye providing material.

The total thickness of the image-receiving layer is preferably in the range of 0.5 to 50 μm, particularly 3 to 30 μm. In the case of two-layer structure, the thickness of the outermost layer is preferably in the range of 0.1 to 2 μm, particularly 0.2 to 1 μm.

The image-receiving layer may optionally contain a dye fixing agent. As the dye fixing agent there can be used a mordant as described in JP-A-3-83685 or compound as described in JP-A-1-188391.

Desirable results can be obtained particularly when a dye of the present invention wherein X is —OH is used.

The heat transfer image-receiving material may comprise an interlayer interposed between the support and the image-receiving layer.

The interlayer serves as any one of or two or more of cushioning layer, porous layer and dye diffusion inhibiting layer by the materials constituting the interlayer. In some cases, it also serves an adhesive.

The dye diffusion inhibiting layer serves to inhibit the diffusion of a heat migrating dye into the support. The binder constituting the diffusion inhibiting layer may be soluble in water or organic solvent. A water-soluble binder may be preferably used. As such a water-soluble binder there can be used the water-soluble binder as described as the binder for the image-receiving layer, particularly gelatin.

The porous layer serves to inhibit the diffusion of heat applied upon heat transfer from the image-receiving layer to the support so that the heat can be effectively utilized.

The image-receiving layer, cushioning layer, porous layer, diffusion inhibiting layer, adhesion layer and other layers constituting the heat transfer image-receiving material may contain finely divided powder of silica, clay, talc, diatomaceous earth, calcium carbonate, calcium sulfate, barium sulfate, aluminum silicate, synthetic zeolite, zinc oxide, lithopone, titanium oxide, alumina or the like.

As the support for the heat transfer image-receiving material there can be used any material which can withstand the transferring temperature and satisfy the requirements such as smoothness, whiteness, sliperiness, friction properties, antistatic properties and depression after transfer. Examples of such a material include paper support such as synthetic paper (e.g., polyolefin paper, polystyrene paper), wood-free paper, coated paper, cast coat paper, wallpaper, backing paper, synthetic resin or emulsion-impregnated paper, synthetic rubber latex-impregnated paper, synthetic resin-containing paper, cardboard, cellulose fiber paper and polyolefin-coated paper (particularly polyethylene double-coated paper), film or sheet of various plastics such as polyolefin, polyvinyl chloride, polyethylene terephthalate, polystyrene methacrylate and polycarbonate, film or sheet obtained by rendering these plastics white reflective, and laminate of a combination thereof.

The heat transfer image-receiving material may comprise a fluorescent brightening agent. Examples of such a fluorescent brightening agent include compounds as disclosed in K. Veenkataraman, *The Chemistry of Synthetic Dyes*, vol. V, Chapter 8, and JP-A-61-143752. Specific examples of such compounds include stilbene compounds, coumarin compounds, biphenyl compounds, benzoxazolyl compounds, naphthalimide compounds, pyrazoline compounds, carbostyryl compounds, and 2,5-dibenzoxazole thiophene compounds.

The fluorescent brightening agent can be used in combination with a discoloration inhibitor.

In the present invention, in order to improve the release of the heat transfer dye providing material from the heat transfer image-receiving material, the layers constituting the dye providing material and/or image-receiving material, particularly the outermost layer in contact with both the materials may preferably contain a release agent.

As such a release agent there can be used any known release agent such as solid or wax substance (e.g., polyethylene wax, amide wax, Teflon powder), surface active agent (e.g., fluorocarbon surface active agent, phosphoric ester) and oil (e.g., paraffin, silicone, fluorocarbon oil). Particularly preferred among these release agents is silicone oil.

As such a silicone oil there can be used unmodified silicone oil as well as modified silicone oil such as carboxy-modified, amino-modified and epoxy-modified silicone oils. Examples of such modified silicone oils include various modified silicone oils as described in *Modified Silicone Oil*, Shin-Etsu Silicone Co., Ltd., pp. 6–18B. If incorporated in an organic solvent-based binder, an amino-modified silicone oil containing a group capable of reacting with a crosslinking agent in the binder (e.g., group capable of reacting with isocyanate) can be effectively used. If used in the form of emulsion dispersion in a water-soluble binder, a carboxy-modified silicone oil (e.g., X-22-3710, a trade name produced by Shin-Etsu Silicone Co., Ltd.) can be effectively used.

The layers constituting the heat transfer dye providing material and heat transfer image-receiving material to be used in the present invention may have been cured by a film hardener.

If an organic solvent-based polymer is cured, a film hardener as described in JP-A-61-199997 and JP-A-58-215398 can be used. For polyester resins, the use of an isocyanate-based film hardener is particularly preferred.

In order to cure a water-soluble polymer, there may be preferably used film hardeners as described in U.S. Pat. No. 4,678,739, 41st column, JP-A-59-116655, JP-A-62-245261, and JP-A-61-18942. Specific examples of such film hardeners include aldehyde-based film hardeners (e.g., formaldehyde), aziridine-based film hardeners, epoxy-based film hardeners (e.g., compound represented by the following formula),

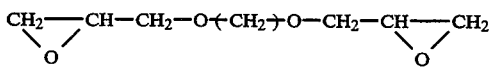

vinylsulfone-based film hardeners (e.g., N,N'-ethylenebis(vinylsulfonylacetamido)ethane), N-methylol-based film hardeners (e.g., dimethylolurea), and high molecular weight film hardeners (e.g., compounds as described in JP-A-62-234157).

The heat transfer dye providing material and heat transfer image-receiving material may comprise a discoloration inhibitor. Examples of such a discoloration inhibitor include antioxidants, ultraviolet absorbents, and certain kinds of metal complexes.

Examples of such antioxidants include chroman compounds, coumaran compounds, phenol compounds (e.g., hindered phenols), hydroquinone derivatives, hindered amine derivatives, and spiroindane compounds. Further, compounds as described in JP-A-61-159644 can be effectively used.

Examples of the ultraviolet absorbents include benzotriazole compounds (as described in U.S. Pat. No. 3,533,794), 4-thiazolidone compounds (as described in U.S. Pat. No. 3,352,681), benzophenone compounds (as described in JP-A-56-2784), and compounds as described in JP-A-54-48535, JP-A-62-136641, and JP-A-61-88256. Further, ultraviolet-absorbing polymers as described in JP-A-62-260152 can be effectively used.

Examples of the metal complexes include compounds as described in U.S. Pat. Nos. 4,241,155, 4,245,018 (3rd–36th columns), and 4,254,195 (3rd–8th columns), JP-A-62-174741, JP-A-61-88256 (pp. 27–29), JP-A-1-75568, and JP-A-63-199248.

Useful examples of discoloration inhibitors are described in JP-A-62-215272 (pp. 125–137).

The discoloration inhibitor for inhibiting the discoloration of a dye which has been transferred to the image-receiving material may have previously been incorporated in the image-receiving material or may be supplied externally, e.g., may be transferred from the dye providing material.

These antioxidants, ultraviolet absorbents and metal complexes can be used in combination.

The layers constituting the heat transfer dye providing material and heat transfer image-receiving material may comprise various surface active agents for the purpose of facilitating coating, improving release properties and slipperiness, inhibiting electrification, accelerating development or like purposes.

Examples of surface active agents which can be used in the present invention include nonionic surface active agents such as saponin (steroid series), alkylene oxide derivatives (e.g., polyethylene glycol, polyethylene glycol alkyl ether, polyethylene glycol alkylaryl ether, polyethylene glycol ester, polyethylene glycol sorbitan ester, polyalkylene glcyol alkylamine, polyalkylene glycol alkylamide, polyethylene oxide addition product of silicone), glycidol derivatives (e.g., alkenylsuccinic polyglyceride, alkylphenol polyglyceride), fatty acid esters of polyhydric alcohol and alkyl esters of saccharide; anionic surface active agents containing acidic groups such as carboxyl group, sulfo group, phospho group, sulfuric ester group and phosphoric ester group (e.g., alkylcarboxylates, alkylsulfonates, alkylnaphthalenesulfonates, alkylsulfuric esters, alkylphosphoric esters, N-acyl-N-alkyltaurines, sulfosuccinic esters, sulfoalkylpolyethylene alkylphenyl ethers, polyoxyethylene alkylphosphoric esters); amphoteric surface active agents such as amino acids, aminoalkylsulfonic acids, aminoalkylsulfuric esters, aminoalkylphosphoric esters, alkylbetaines and amine oxides; and cationic surface active agents such as alkylamine salts, aliphatic quaternary ammonium salts, aromatic quaternary ammonium salts, heterocyclic quaternary ammonium salts (e.g., pyridinium, imidazolium) and phosphonium or sulfonium salts containing aliphatic or heterocyclic groups. Specific examples of these surface active agents are given in JP-A-62-173463 and JP-A-62-183457.

When the substance capable of receiving a heat migrating dye, the release agent, the discoloration inhibitor, the ultraviolet absorbent, the fluorescent brightening agent and other hydrophobic compounds are dispersed in a water-soluble binder, a surface active agent may be preferably used as a dispersing aid. For this purpose, there can be preferably used the above mentioned surface active agents. In addition, surface active agents as described in JP-A-59-157636, pp. 37–38, are particularly preferred.

The layers constituting the heat transfer dye providing material and heat transfer image-receiving material may comprise an organic fluorocarbon compound for the purpose of improving slipperiness and release properties, inhibiting electrification or like purposes. Typical examples of such an organic fluorocarbon compound include fluorocarbon surface active agents as described in JP-B-57-9053 (8th–17th columns), JP-A-61-20944 and JP-A-62-135826, and hydrophobic fluorocarbon compounds such as oily fluorocarbon compound (e.g., fluorocarbon oil) and solid fluorocarbon compound resin (e.g., tetrafluoroethylene resin). (The term "JP-B" as used herein means an "examined Japanese patent publication".)

The heat transfer dye providing material and heat transfer image-receiving material may comprise a matting agent. Examples of such a matting agent include compounds as described in JP-A-61-88256, page 29, such as silicon dioxide, polyolefin and polymethacrylate. Other examples of such a matting agent include compounds as described in JP-A-63-274944, and JP-A-63-274952, such as benzoguanamine resin beads, polycarbonate resin beads and AS resin beads.

The present invention will be further described in the following examples, but the present invention should not be construed as being limited thereto unless they depart from the spirit of the present invention.

EXAMPLE 1

The absorption characteristics of Dyes 1, 2, 8, 12, 23, 101, 102, 104, 105, 106, 128, 129, 130, and 131 of the present invention in ethyl acetate are as shown in FIGS. 1 to 14. In these figures, the abbreviation "ABS" in the ordinate means the absorbance. The absorption maxima wavelength ($\lambda$max) in ethyl acetate and other physical properties of the dyes of the present invention are as follows:

| Dye | $\lambda$max | Notes |
| --- | --- | --- |
| Dye 1 | 697 nm | |
| Dye 2 | 685 nm | |
| Dye 8 | 694 nm | |
| Dye 12 | 698 nm | |
| Dye 23 | 658 nm | |
| Dye 101 | 660 nm | Gummy compound |
| Dye 102 | 655 nm | Amorphous |
| Dye 104 | 601 nm | Amorphous (begins to be gummy at 110° C. and completely melts at 155° C.) |
| Dye 105 | 582 nm | — |
| Dye 106 | 641 nm | Doesn't melt even at 265° C. |
| Dye 128 | 658 nm | — |
| Dye 129 | 677 nm | — |
| Dye 130 | 639 nm | |
| Dye 131 | 629 nm | |

Among these dyes, Dye 12, for example, exhibits a sufficient and sharp absorption in the vicinity of 700 nm and little or no absorption in the wavelength region of longer than 800 nm. It can thus be seen that this dye has excellent properties as a filter dye for light-sensitive material utilizing infrared rays.

EXAMPLE 2

(Preparation of heat transfer dye providing material (1-1))

Onto a 6-μm thick polyethylene terephthalate film (produced by Teijin Limited) which had been rendered heat resistant and smoothened on its back side as a support was coated a heat transfer dye providing layer coating composition having the following formulations by a wire bar coating process to a dry thickness of 1.5 μm to prepare a heat transfer dye providing material (1-1).

Heat transfer dye providing layer coating composition:

| Dye 2 | 10 mmol |
|---|---|
| Polyvinyl butyral resin (Denka Butyral 5000-A produced by Denki Kagaku Kogyo K.K.) | 3 g |
| Toluene | 40 cc |
| Methyl ethyl ketone | 40 cc |
| Polyisocyanate (Takenate D110N produced by Takeda Chemical Industries, Ltd.) | 0.2 cc |

Heat transfer dye providing materials (1-2) to (1-10) of the present invention and a comparative heat transfer dye providing material (1-11) were prepared in the same manner as mentioned above except that Dye 2 was replaced by other dyes as set forth in Table 1, respectively.

(Preparation of heat transfer image-receiving material)

Onto a 150-μm thick synthetic paper (YUPO-FPG-150 produced by Oji Yuka Goseishi Co., Ltd.) was coated an image-receiving layer coating composition having the following formulations by a wire bar coating process to a dry thickness of 8 μm to prepare a heat transfer image-receiving material. The material was tentatively dried by a dryer, and then dried in an oven at a temperature of 100° C. for 30 minutes.

Image-receiving layer coating composition:

| Polyester resin (Vylon 280 produced by Toyobo Co., Ltd.) | 22 g |
|---|---|
| Polyisocyanate (KP-90 produced by Dainippon Ink And Chemicals, Inc.) | 4 g |
| Amino-modified silicone oil (KF-857 produced by Shin-Etsu Silicone Co., Ltd.) | 0.5 g |
| Methyl ethyl ketone | 85 cc |
| Toluene | 85 cc |
| Cyclohexanone | 15 cc |

The heat transfer dye providing materials (1-1) to (1-11) thus obtained were each laminated with the heat transfer image-receiving material in such an arrangement that the heat transfer dye providing layer was brought into contact with the image-receiving layer. Printing was effected by a thermal head on the heat transfer dye providing material from the support side under the conditions of thermal head output of 0.25 W/dot, pulse width of 0.15 to 15 msec., and dot density of 6 dots/mm to cause the cyan dye to be imagewise transferred to the image-receiving layer in the image-receiving material. As a result, a sharp recording was provided free of uneven transfer.

The heat transfer image-receiving materials on which recording had been made were then irradiated with light from a 17,000 lux fluorescent lamp for 7 days to examine the stability of the dyes. The heat transfer image-receiving materials were also stored at a temperature of 60° C. under dry conditions for 7 days to examine the fastness of the dyes to heat. The portion of these specimens which had exhibited a reflection density of 1.0 before these stability tests were measured again after the tests. For the evaluation of stability, percentage of the measurements to the initial value (1.0) were determined. The results are set forth in Table 1. The measurement was effected at λmax.

TABLE 1

| Heat transfer dye providing material | Dye | Maximum density | Light fastness (% remaining) | Heat fastness (% remaining) | Remarks |
|---|---|---|---|---|---|
| 1-1 | 2 | 1.8 | 90 | 85 | Present invention |
| 1-2 | 3 | 1.3 | 92 | 86 | " |
| 1-3 | 4 | 1.3 | 91 | 85 | " |
| 1-4 | 8 | 1.9 | 91 | 99 | " |
| 1-5 | 10 | 2.0 | 93 | 100 | " |
| 1-6 | 12 | 1.3 | 94 | 98 | " |
| 1-7 | 16 | 1.5 | 93 | 98 | " |
| 1-8 | 17 | 1.3 | 91 | 95 | " |
| 1-9 | 22 | 1.4 | 91 | 85 | " |
| 1-10 | 29 | 1.7 | 90 | 86 | " |
| 1-11 | a | 2.5 | 87 | 88 | Comparative |

Comparative Dye a

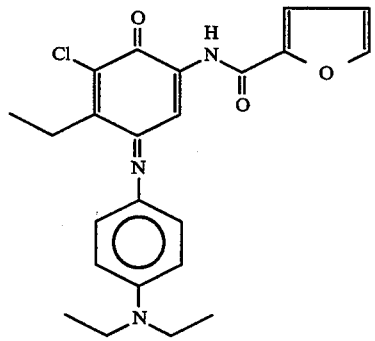

Dye described in JP-A-2-98492

The above mentioned results show that the dye images derived from the dyes of the present invention exhibit a higher light fastness than the dye image derived from the known azomethine Dye a.

Further, as can be seen in the results of the heat transfer dye providing materials 1-4 to 1-8, among the dyes of the present invention, those represented by the general formula (I) wherein $R^{10}$ is unsubstituted exhibit a remarkably high heat fastness.

EXAMPLE 3

Heat transfer dye providing materials (2-1) to (2-7) were prepared in the same manner as in Example 2 except that Dye 2 to be incorporated in the heat transfer dye providing layer coating composition of Example 2 was replaced by the dyes set forth in Table 2.

Using the image-receiving material as prepared in Example 2, printing was made on these heat transfer dye providing materials. All these heat transfer dye providing materials provided a sharp recorded image with a high density free of uneven transfer. The dye images exhibited a high light fastness.

TABLE 2

| Heat transfer dye providing material | Dye |
| --- | --- |
| 2-1 | 5 |
| 2-2 | 6 |
| 2-3 | 9 |
| 2-4 | 13 |
| 2-5 | 18 |
| 2-6 | 24 |
| 2-7 | 25 |

EXAMPLE 4

Heat transfer dye providing materials (3-1), (3-2), and (3-3) were prepared in the same manner as in Example 2 except that the polyvinyl butyral resin and dye to be incorporated in the heat transfer dye providing layer coating composition of Example 2 were replaced by the resins and dyes set forth in Table 3.

Using the same image-receiving material as prepared in Example 2, printing was made on these heat transfer dye providing materials. As shown in Table 3, all these heat transfer dye providing materials provided a sharp recorded image free of uneven transfer. The dye images exhibited a high light fastness.

TABLE 3

| Heat transfer dye providing material | Resin | Dye | Light fastness (% remaining) |
| --- | --- | --- | --- |
| 3-1 | Ethyl cellulose | 2 | 91 |
| 3-2 | Cellulose acetobutyrate | 4 | 92 |
| 3-3 | Polysulfone | 8 | 91 |

EXAMPLE 5

Heat transfer dye providing materials (4-1) to (4-9) were prepared in the same manner as in Example 2 except that Dye 2 to be incorporated in the heat transfer dye providing layer coating composition of Example 2 was replaced by the dyes set forth in Table 4.

The heat transfer dye providing materials (4-1) to (4-9) thus obtained were each laminated with the heat transfer image-receiving material as prepared in Example 2 in such an arrangement that the heat transfer dye providing layer was brought into contact with the image-receiving layer. Printing was effected by a thermal head on the heat transfer dye providing material from the support side under the conditions of thermal head output of 0.25 W/dot, pulse width of 0.15 to 15 msec., and dot density of 6 dots/mm to cause the cyan or magenta dye to be imagewise transferred to the image-receiving layer in the image-receiving material. As a result, a sharp recording was provided free of uneven transfer.

The heat transfer image-receiving materials on which recording had been made were stored at a temperature of 60° C. under dry conditions for 7 days to examine the fastness of the dyes to heat. The portion of these specimens which had exhibited a status A reflection density of 1.0 before these stability tests were measured again after the tests. For the evaluation of stability, percentage of the measurements to the initial value (1.0) were determined. The results are set forth in Table 4.

TABLE 4

| Heat transfer dye providing material | Dye | Maximum density | Heat fastness (% remaining) | Remarks |
| --- | --- | --- | --- | --- |
| 4-1 | 113 | 2.5 | 90 | Present invention |
| 4-2 | 114 | 2.6 | 91 | " |
| 4-3 | 115 | 2.3 | 90 | " |
| 4-4 | 116 | 2.2 | 89 | " |
| 4-5 | 117 | 2.6 | 94 | " |
| 4-6 | 118 | 2.4 | 91 | " |
| 4-7 | 119 | 2.2 | 90 | " |
| 4-8 | 120 | 2.1 | 98 | " |
| 4-9 | b | 2.0 | 83 | Comparative |

Comparative Dye b

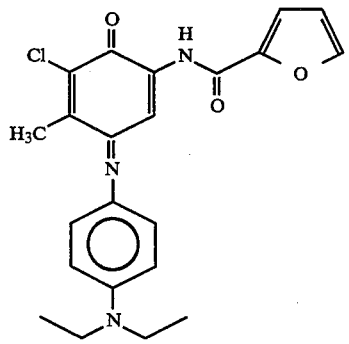

Dye described in JP-A-2-98492

Figure 15:
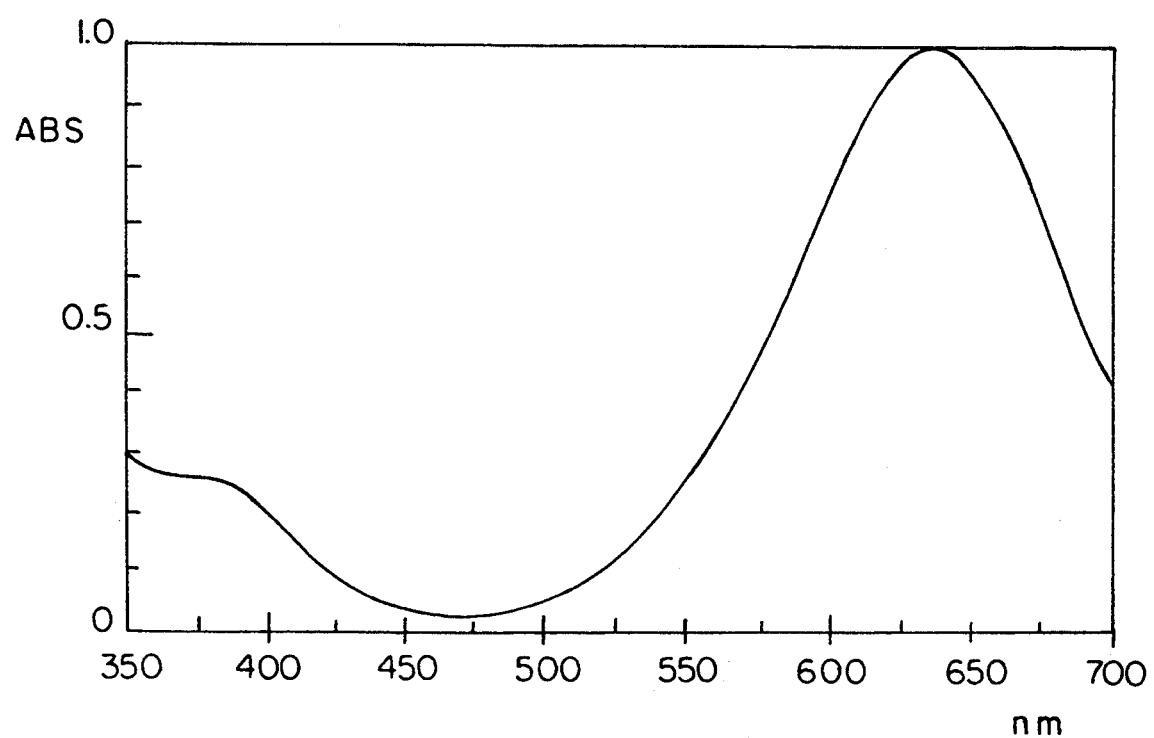
FIG. 15 illustrates the absorption characteristics of Comparative Dye b in ethyl acetate.

FIG. 15 shows the absorption characteristics of Comparative Dye b in ethyl acetate.

Table 4 shows that the dyes of the present invention exhibit a high transfer density and a high heat fastness.

EXAMPLE 6

Heat transfer dye providing materials (5-1) to (5-5) were prepared in the same manner as in Example 2 except that Dye 2 to be incorporated in the heat transfer dye providing layer coating composition of Example 2 was replaced by the dyes set forth in Table 5.

Using the image-receiving material as prepared in Example 2, printing was made on these heat transfer dye providing materials. All these heat transfer dye providing materials provided a sharp recorded image with a high density free of uneven transfer. The dye images exhibited a high heat fastness.

TABLE 5

| Heat transfer dye providing material | Dye |
| --- | --- |
| 5-1 | 121 |
| 5-2 | 123 |
| 5-3 | 124 |
| 5-4 | 125 |
| 5-5 | 126 |

EXAMPLE 7

Heat transfer dye providing materials (6-1), (6-2), and (6-3) were prepared in the same manner as in Example 2 except that the polyvinyl butyral resin and dye to be incorporated in the heat transfer dye providing layer coating composition of Example 2 were replaced by the resins and dyes set forth in Table 6.

Using the same image-receiving material as prepared in Example 2, printing was made on these heat transfer dye providing materials. As shown in Table 6, all these heat transfer dye providing materials provided a sharp recorded image free of uneven transfer. The dye images also exhibited a high heat fastness as a result of the same heat test as effected in Example 5.

TABLE 6

| Heat transfer dye providing material | Resin | Dye | Light fastness (% remaining) |
|---|---|---|---|
| 6-1 | Ethyl cellulose | 113 | 91 |
| 6-2 | Cellulose acetobutyrate | 114 | 93 |
| 6-3 | Polysulfone | 115 | 92 |

In order to discuss the combination of other heat transfer dye providing mateials with the above mentioned heat transfer dye providing materials of the present invention, Examples 8 to 13 will be given below.

EXAMPLE 8

(Preparation of heat transfer image-receiving material)

Onto a 150-μm thick synthetic paper (YUPO-FPG-150 produced by Oji Yuka Goseishi Co., Ltd.) was coated an image-receiving layer coating composition having the following formulations by a wire bar coating process to a dry thickness of 10 μm to prepare a heat transfer image-receiving material. The material was tentatively dried by a dryer, and then dried in an oven at a temperature of 100° C. for 30 minutes.

| Image-receiving layer coating composition: | |
|---|---|
| Polyester resin No. 1 | 2.0 g |
| Amino-modified silicone oil (KF-857 produced by Shin-Etsu Silicone Co., Ltd.) | 0.5 g |
| Epoxy-modified silicone oil (KF-100T produced by Shin-Etsu Silicone Co., Ltd.) | 0.5 g |
| Methyl ethyl ketone | 85 cc |
| Toluene | 85 cc |
| Cyclohexanone | 30 cc |

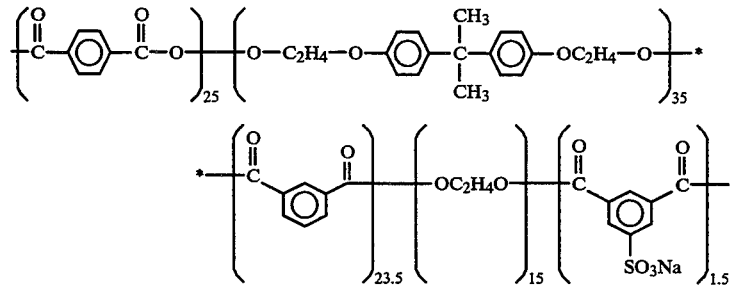

The heat transfer image-receiving material thus obtained was laminated with the heat transfer dye providing materials comprising the dyes of the present invention prepared in Examples 2, 3, 5, and 6. Printing was effected on these laminations. As a result, a sharp image recording was provided. These dye images exhibited a high heat fastness and light fastness.

EXAMPLE 9

(Preparation of heat transfer image-receiving material)

A resin-coated paper was prepared by laminating a 200-μm thick paper with polyethylene to a thickness of 15 μm on one side and to a thickness of 25 μm on the other side. Onto the 15-μm thick polyethylene coating side of the paper was coated an image-receiving layer coating composition having the following formulations by a wire bar coating process to a dry thickness of 10 μm. The material was then dried to prepare a heat transfer image-receiving material.

| Image-receiving layer coating composition: | |
|---|---|
| Polyester resin No. 1 | 25 g |
| Amino-modified silicone oil (KF-857 produced by Shin-Etsu Silicone Co., Ltd.) | 0.8 g |
| Polyisocyanate (KP-90 produced by Dainippon Ink And Chemicals, Inc.) | 4 g |
| Methyl ethyl ketone | 100 cc |
| Toluene | 100 cc |

Printing was effected in the same manner as in Example 2. As a result, a sharp image recording was provided with a high density. The dye images exhibited a high heat fastness and light fastness.

EXAMPLE 10

(Preparation of heat transfer image-receiving material)

A solution of a dye accepting polymer in an organic solvent having the following formulations (B') was emulsion-dispersed in an aqueous soluton of gelatin having the following formulations (A') by means of a homogenizer to prepare a gelatin dispersion of a dye accepting substance.

| (A') Aqueous solution of gelatin: | |
|---|---|
| Gelatin | 2.3 g |
| 5% Aqueous solution of sodium dodecylbenzenesulfonate | 20 cc |
| Water | 80 cc |
| (B') Dye accepting polymer solution: | |
| Polyester resin (Vylon 300 produced by Toyobo Co., Ltd.) | 7.0 g |
| Carboxy-modified silicone oil (X-22-3710) | 0.7 g |
| Methyl ethyl ketone | 20 cc |
| Toluene | 10 cc |
| Triphenyl phosphate | 1.5 g |

To the dispersion thus prepared was added a solution of 0.5 g of a fluorocarbon surface active agent (a) having the following structural formula in 10 cc of a 1:1 mixture of water and methanol to prepare an image-receiving layer coating composition.

Fluorocarbon surface active agent (a)

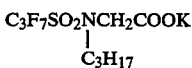

The coating composition thus obtained was coated on a 150-μm thick synthetic paper (YUPO-SGG-150) which had been corona-discharged on the surface thereof by a wire bar coating process to a wet thickness of 75 μm, and then dried to prepare a heat transfer image-receiving material.

Using the heat transfer dye providing materials comprising the dyes of the present invention as prepared in Examples 2, 3, 5 and 6 and the above mentioned heat transfer image-receiving material, image recording was effected in the same manner as in Example 2.

The images thus obtained exhibited a high density and sharpness and a high heat fastness and light fastness.

EXAMPLE 11

(Preparation of heat transfer image-receiving material)

A heat transfer image-receiving material was prepared in the same manner as in Example 2 except that the following image-receiving layer coating composition was used.

Image-receiving layer coating composition:

This composition was the same as the image-receiving layer coating composition of Example 2 except that 7 g of an ultraviolet absorbent having the following structural formula was further added:

Ultraviolet absorbent

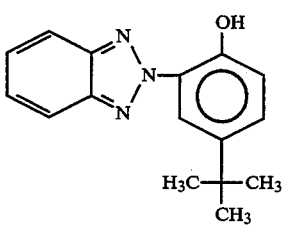

Using the heat transfer dye providing materials comprising the dyes of the present invention as prepared in Examples 2, 3, 5 and 6, printing was made on these specimens in the same manner as in Example 2. As a result, sharp images were provided with a high density. These dye images exhibited a high light fastness as compared with the case where the image-receiving material of Example 2 was used.

EXAMPLE 12

Heat transfer dye providing materials (7-1) to (7-7) were prepared in the same manner as in Example 2 except that Dye 2 (10 mmol) to be incorporated in the heat transfer dye providing layer coating composition of Example 2 was replaced by two dyes (5 mmol each) as set forth in Table 7, respectively. Further, heat transfer dye providing materials (7-8) and (7-9) were prepared in the same manner as in Example 2 except that Dye 2 (10 mmol) to be incorporated in the heat transfer dye providing layer coating composition of Example 2 was replaced by a dye (10 mmol) as set forth in Table 7, respectively.

Using these heat transfer dye providing materials, dye images were transferred to the heat transfer dye image-receiving material as prepared in Example 2 in the same manner as in Example 2. For the evaluation of the storage stability of the dye images on the image receiving materials, these specimens were stored in an oven at 60° C. and 70% RH for 1 week to examine the fastness of the dye images to heat and moisture.

The criterion of evaluation is as follows:

E: No dye agglomeration or crystallization observed under microscope

F: Slight dye agglomeration or crystallization observed under microscope

P: Dye agglomeration or crystallization visually observed on the whole surface

The results are set forth in Table 7.

TABLE 7

| No. | Dye image-receiving material | Dye | Storage stability | Remarks |
| --- | --- | --- | --- | --- |
| 1 | 7-1 | 8 and 11 | E | Present invention |
| 2 | 7-2 | 8 and 12 | E | Present invention |
| 3 | 7-3 | 12 and 14 | E | Present invention |
| 4 | 7-4 | 2 and 4 | E | Present invention |
| 5 | 7-5 | 2 and 8 | E | Present invention |
| 6 | 7-6 | 2 and 12 | E | Present invention |
| 7 | 7-7 | 12 and 8 | E | Present invention |
| 8 | 7-8 | 2 | F | Present invention |
| 9 | 7-9 | a | P | Comparative |

As can be seen in the comparison of the results of Nos. 8 and 9 with that of Nos. 1 to 7, the dyes of the present invention exhibit a higher storage stability when incorporated in the heat transfer dye providing material in admixture than when used singly.

EXAMPLE 13

Heat transfer dye providing materials (8-1) to (8-7) were prepared in the same manner as in Example 2 except that Dye 2 (10 mmol) to be incorporated in the heat transfer dye providing layer coating composition of Example 2 was replaced by two dyes (5 mmol each) as set forth in Table 8, respectively. Further, heat transfer dye providing materials (8-8) and (8-9) were prepared in the same manner as in Example 2 except that Dye 2 (10 mmol) to be incorporated in the heat transfer dye providing layer coating composition of Example 2 was replaced by a dye (10 mmol) as set forth in Table 8, respectively. Using these heat transfer dye providing materials, dye images were transferred to the heat transfer dye image-receiving material as prepared in Example 5 in the same manner as in Example 5 to prepare heat transfer dye image-receiving materials (8-1) to (8-9).

For the evaluation of the storage stability of the image-receiving materials thus prepared, these specimens were stored in an oven at 60° C. under dry conditions for 1 week to examine the heatfastness thereof.

The criterion of evaluation is as follows:

E: No dye agglomeration or crystallization observed under microscope

F: Slight dye agglomeration or crystallization observed under microscope

P: Dye agglomeration or crystallization visually observed on the whole surface

The results are set forth in Table 8.

TABLE 8

| No. | Dye image-receiving material | Dye | Storage stability | Remarks |
|---|---|---|---|---|
| 1 | 8-1 | 113 and b | E | Present invention |
| 2 | 8-2 | 113 and 114 | E | Present invention |
| 3 | 8-3 | 114 and b | E | Present invention |
| 4 | 8-4 | 113 and 115 | E | Present invention |
| 5 | 8-5 | 116 and b | E | Present invention |
| 6 | 8-6 | 117 and 115 | E | Present invention |
| 7 | 8-7 | 113 | F | Present invention |
| 8 | 8-8 | 115 | F | Present invention |
| 9 | 8-9 | b | P | Comparative |

As can be seen in Table 8, the dyes of the present invention exhibit a higher image stability than the comparative dye even when used singly. The dyes of the present invention exhibit a higher image stability when used in admixture than when used singly.

It is also shown that even the comparative dye, which exhibits a low image stability when used singly, exhibits an improved image stability when used in admixture with the dyes of the present invention.

The azomethine dye of the present invention is inexpensive, and its synthesis is easy. The azomethine dye of the present invention is also fast to heat, light, moisture, and air. By properly selecting its substituents, the azomethine dye of the present invention can have various hues and become a dye that effectively absorbs near infrared rays. The azomethine dye of the present invention can become a cyan dye having a sharp absorption.

Further, when used as a heat transfer dye, the azomethine dye of the present invention can be efficiently transferred, providing an image having a high heat fastness and light fastness.

The image thus formed exhibits a high sharpness, saturation and storage stability.

The azomethine dye of the present invention exhibits a sharp absorption waveform that provides an excellent image color reproducibility. The azomethine dye of the present invention also exhibit excellent properties required for filter.

While the invention has been described in detail and with reference to specific embodiments thereof, it will be apparent to one skilled in the art that various changes and modifications can be made therein without departing from the spirit and scope thereof.

What is claimed is:

1. An azomethine dye represented by the formula (I), (II) or (III):

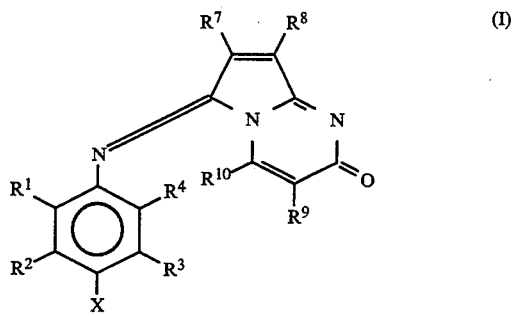

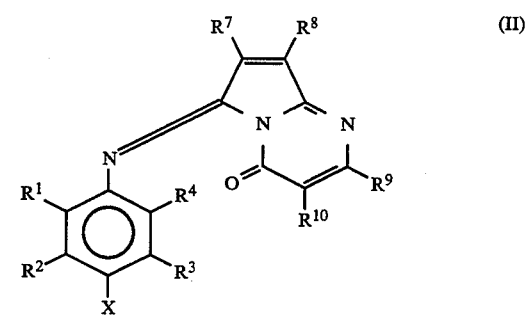

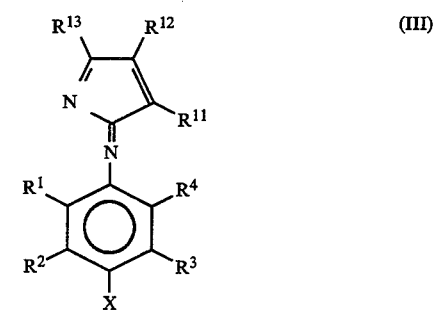

wherein $R^1$, $R^2$, $R^3$ and $R^4$ each independently represents hydrogen or nonmetallic atom; X represents —OH or —$NR^5R^6$; $R^5$ and $R^6$ each independently represents hydrogen, alkyl, aryl or heterocyclic, wherein the heterocyclic is selected from the group consisting of

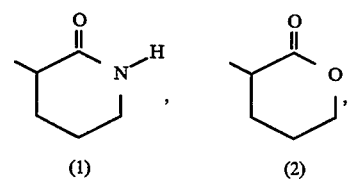

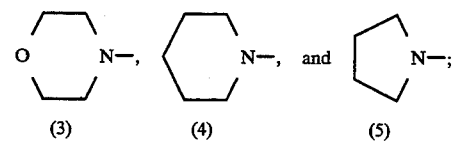

and $R^7$, $R^8$, $R^9$, $R^{10}$, $R^{11}$, $R^{12}$ and $R^{13}$ each independently represents hydrogen or nonmetallic atom.

2. An azomethine dye represented by the following formula (I) or (II):

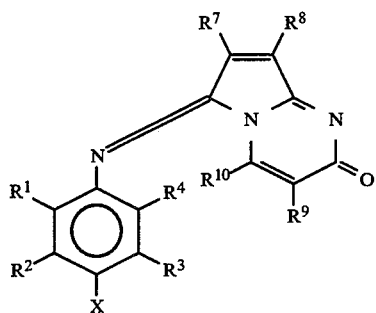

(I)

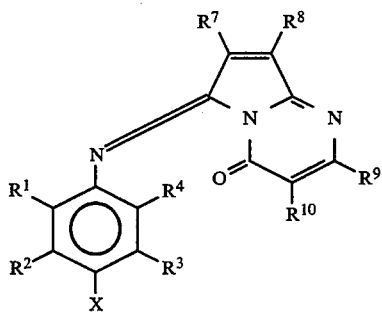

(II)

wherein $R^1$, $R^2$, $R^3$ and $R^4$ each independently represents hydrogen or nonmetallic atom; X represents —OH or —$NR^5R^6$ in which $R^5$ and $R^6$ each independently represents hydrogen, alkyl, aryl or heterocyclic, wherein the heterocyclic is selected from the group consisting of

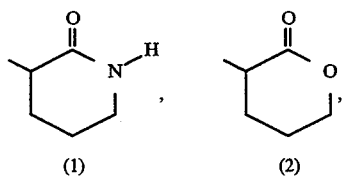

(1)　　(2)

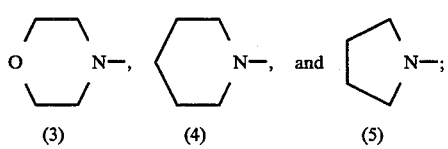

(3)　　(4)　　(5)

and $R^7$, $R^8$, $R^9$ and $R^{10}$ each independently represents hydrogen or nonmetallic atom, with the proviso that at least one of $R^7$ and $R^8$ is an electrophile having a Hammett's substituent constant σp value in the range of 0.15 to 0.78.

3. A near infrared absorbing azomethine dye represented by the following formula (I) or (II):

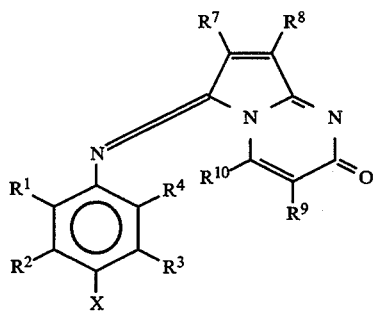

(I)

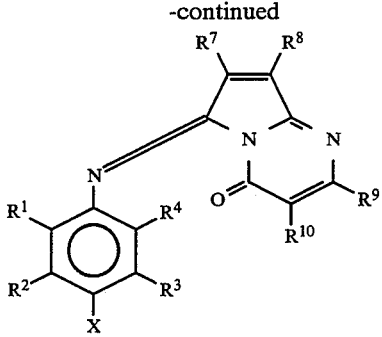

(II)

wherein $R^1$ represents alkyl, —$OR^{21}$ or —$NR^{22}$—CO—R23, wherein $R^{21}$ represents alkyl, aryl or heterocyclic, wherein the heterocyclic is selected from the group consisting of

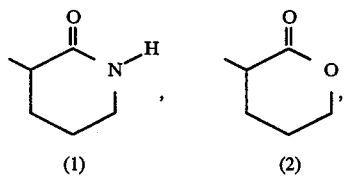

(1)　　(2)

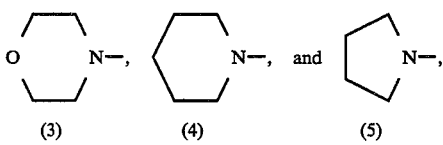

(3)　　(4)　　(5)

$R^{22}$ represents hydrogen or alkyl, $R^{23}$ represents alkyl, aryl or heterocyclic, wherein the heterocyclic is selected from the group consisting of

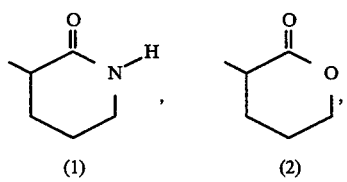

(1)　　(2)

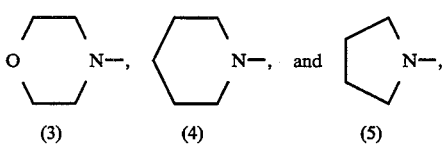

(3)　　(4)　　(5)

—$OR^{21}$, —$NR^{22}R^{24}$, and $R^{24}$ represent a substituent which is attached to the nitrogen; $R^2$, $R^3$ and $R^4$ each represents hydrogen or nonmetallic atom; X represents —OH or —$NR^5R^6$, wherein $R^5$ and $R^6$ each independently represents hydrogen, alkyl, aryl or heterocyclic, wherein the heterocyclic is selected from the group consisting of

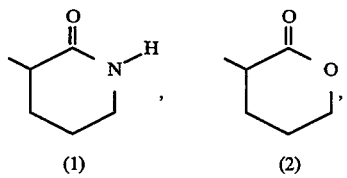

(1)　　(2)

-continued

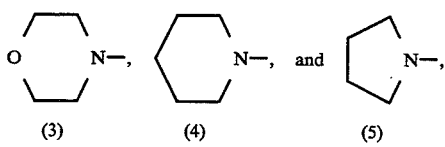

and $R^7$, $R^8$, $R^9$ and $R^{10}$ each independently represents hydrogen or nonmetallic atom, with the proviso that at least one of $R^7$ and $R^8$ is an electrophile having a Hammett's substituent constant $\sigma p$ value in the range of 0.15 to 0.78.

4. An azomethine dye represented by the following formula (III):

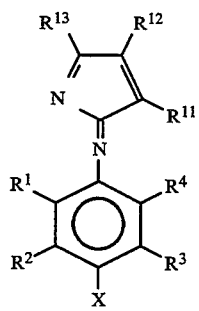

wherein $R^1$, $R^2$, $R^3$ and $R^4$ each represents hydrogen or nonmetallic atom; X represents —OH or —$NR^5R^6$, wherein $R^5$ and $R^6$ each independently represents hydrogen, alkyl, aryl or heterocyclic, wherein the heterocyclic is selected from the group consisting of

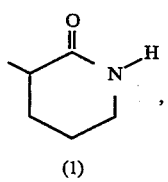
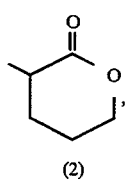

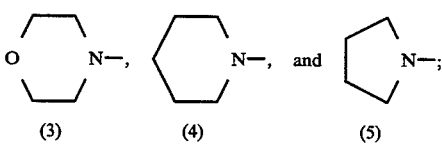

and $R^{11}$, $R^{12}$ and $R^{13}$ each represents hydrogen or nonmetallic atom, with the proviso that at least one of $R^{11}$, $R^{12}$ and $R^{12}$ is an electrophile having a Hammett's substituent constant $\sigma p$ value in the range of 0.3 to 0.78.

5. A dye as claimed in claim 4, wherein the sum of Hammett's substituent constant $\sigma p$ values of $R^{11}$, $R^{12}$ and $R^{13}$ is from 1.0 to 2.50.

6. A heat transfer dye proving material comprising a support having thereon a dye providing layer containing a heat migrating dye, said dye providing layer comprising at lest one azomethine dye represented by the following formula (I), (II) or (III):

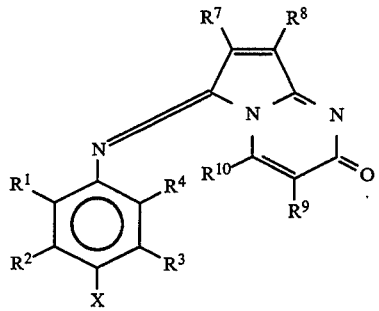

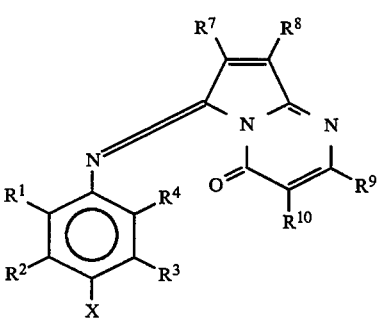

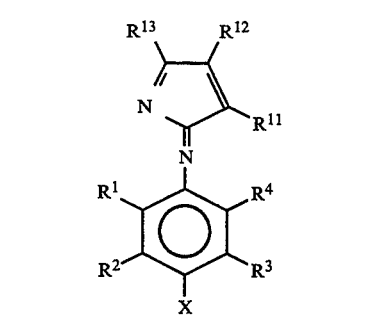

wherein $R^1$, $R^2$, $R^3$ and $R^4$ each independently represents hydrogen or nonmetallic atom; X represents —OH or —$NR^5R^6$; $R^5$ and $R^6$ each independently represents hydrogen, alkyl, aryl or heterocyclic, wherein the heterocyclic is selected from the group consisting of

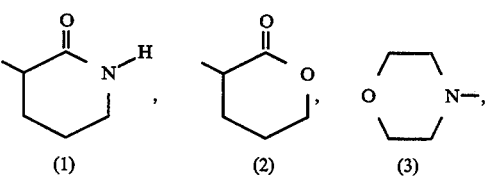

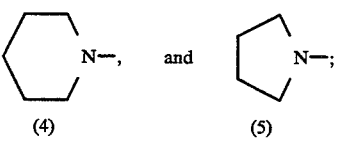

and $R^7$, $R^8$, $R^9$, $R^{10}$, $R^{11}$, $R^{12}$ and $R^{13}$ each independently represents hydrogen or nonmetallic atom.

7. The azomethine dye according to claim 1, wherein at least one of $R^1$ and $R^2$; $R^2$ and $R^5$; $R^5$ and $R^6$; $R^6$ and $R^3$; $R^3$ and $R^4$; $R^7$ and $R^8$; $R^9$ and $R^{10}$; $R^{11}$ and $R^{12}$; and $R^{12}$ and $R^{13}$ are bonded to each other to form a ring.

8. The azomethine dye according to claim 2, wherein at least one of $R^1$ and $R^2$; $R^2$ and $R^5$; $R^5$ and $R^6$; $R^6$ and $R^3$; $R^3$ and $R^4$; $R^7$ and $R^8$; and $R^9$ and $R^{10}$ are bonded to each other to form a ring.

9. The near infrared absorbing azomethine dye according to claim 3, wherein at least one of $R^1$ and $R^2$; $R^2$ and $R^5$; $R^5$ and $R^6$; $R^6$ and $R^3$; $R^3$ and $R^4$; $R^7$ and $R^8$; and $R^9$ and $R^{10}$ are bonded to each other to form a ring.

10. The azomethine dye according to claim 4, wherein at least one of $R^1$ and $R^2$; $R^2$ and $R^5$; $R^5$ and $R^6$; $R^6$ and $R^3$; $R^3$ and $R^4$; $R^{11}$ and $R^{12}$; and $R^{12}$ and $R^{13}$ are bonded to each other to form a ring.

11. The heat transfer dye proving material according to claim 6, wherein at least one of $R^1$ and $R^2$; $R^2$ and $R^5$; $R^5$ and $R^6$; $R^6$ and $R^3$; $R^3$ and $R^4$; $R^7$ and $R^8$; $R^9$ and $R^{10}$; $R^{11}$ and $R^{12}$; and $R^{12}$ and $R^{13}$ are bonded to each other to form a ring.

* * * * *